(12) United States Patent
Phillips

(10) Patent No.: US 12,097,594 B2
(45) Date of Patent: Sep. 24, 2024

(54) MODULAR FIXTURE PLATE SYSTEM FOR POSITIONING A WORKPIECE DURING A MANUFACTURING AND/OR INSPECTION PROCESS

(71) Applicant: Steven E. Phillips, Boylston, MA (US)

(72) Inventor: Steven E. Phillips, Boylston, MA (US)

( * ) Notice: Subject to any disclaimer, the term of this patent is extended or adjusted under 35 U.S.C. 154(b) by 0 days.

(21) Appl. No.: 17/959,563

(22) Filed: Oct. 4, 2022

(65) Prior Publication Data

US 2023/0140513 A1 May 4, 2023

Related U.S. Application Data

(63) Continuation of application No. 16/251,923, filed on Jan. 18, 2019, now Pat. No. 11,458,597, which is a continuation of application No. 14/195,607, filed on Mar. 3, 2014, now Pat. No. 10,183,380.

(60) Provisional application No. 61/825,846, filed on May 21, 2013, provisional application No. 61/771,575, filed on Mar. 1, 2013.

(51) Int. Cl.
*B23Q 37/00* (2006.01)
*B23Q 1/03* (2006.01)
*B23Q 3/02* (2006.01)
*B25B 11/00* (2006.01)

(52) U.S. Cl.
CPC ............... *B25B 11/00* (2013.01); *B23Q 1/03* (2013.01); *B23Q 3/02* (2013.01); *B23Q 37/005* (2013.01)

(58) Field of Classification Search
CPC .. B25B 11/00; B23Q 1/03; B23Q 3/02; B23Q 37/005
See application file for complete search history.

(56) References Cited

U.S. PATENT DOCUMENTS

| 1,571,092 A | 1/1926 | Lally |
| 1,894,061 A | 1/1933 | Sanders |
| 3,512,324 A * | 5/1970 | Reed ................. E04F 15/02405 52/586.1 |
| 4,805,887 A | 2/1989 | Ray |
| 5,052,158 A * | 10/1991 | D'Luzansky ......... F16B 17/008 428/44 |

(Continued)

FOREIGN PATENT DOCUMENTS

| DE | 202009010082 | 11/2009 |
| EP | 1120189 | 8/2001 |

(Continued)

OTHER PUBLICATIONS

Jergens Ball Lock Mounting Systems Catalog, published in 2005.

(Continued)

*Primary Examiner* — Nirvana Deonauth
(74) *Attorney, Agent, or Firm* — Pandiscio & Pandiscio

(57) ABSTRACT

A modular fixture plate system comprising:
at least one interlocking fixture plate comprising at least one of a male end and a female end, wherein the male end comprises at least one male projection and the female end comprises at least one female recess; and
a docking plate comprising at least one of at least one male projection and at least one female recess;
wherein at least one male projection or female recess of the at least one interlocking fixture plate is interlocked with a mating one of the at least one male projection or the at least one female recess of the docking plate.

18 Claims, 30 Drawing Sheets

(56) References Cited

U.S. PATENT DOCUMENTS

| | | | |
|---|---|---|---|
| 5,064,321 A | 11/1991 | Barnes | |
| 5,809,905 A | 9/1998 | John et al. | |
| 6,431,963 B1 | 8/2002 | Kiribuchi | |
| 10,183,380 B2 * | 1/2019 | Phillips | B23Q 37/005 |
| 11,458,597 B2 * | 10/2022 | Phillips | B23Q 37/005 |
| 2010/0299945 A1 | 12/2010 | Lacy | |
| 2011/0179728 A1 | 7/2011 | Cerny et al. | |
| 2013/0167458 A1 * | 7/2013 | Cerny | E04F 15/10 |
| | | | 52/177 |
| 2013/0175751 A1 | 7/2013 | Canuto | |
| 2015/0097327 A1 * | 4/2015 | Morgan | B23Q 3/18 |
| | | | 269/287 |
| 2022/0371145 A1 | 11/2022 | Becker | |

FOREIGN PATENT DOCUMENTS

| | | | |
|---|---|---|---|
| EP | 2103537 | 9/2009 | |
| EP | 2292381 | 3/2011 | |
| EP | 2417871 | 2/2012 | |
| GB | 1341356 | 12/1973 | |
| WO | WO 2006/129264 | 12/2006 | |
| WO | WO-2006129264 A1 * | 12/2006 | B23K 26/10 |
| WO | WO 2011/064349 | 6/2011 | |

OTHER PUBLICATIONS

Jergens 2009 Master Catalog, published in 2009.
R&R Sales and Engineering, Maximize Your Vision: Fixturing For Vision Systems, published in 2010.
R&R Sales and Engineering, R&R Modular Fixtures: Component Catalog, published in 2008.

* cited by examiner

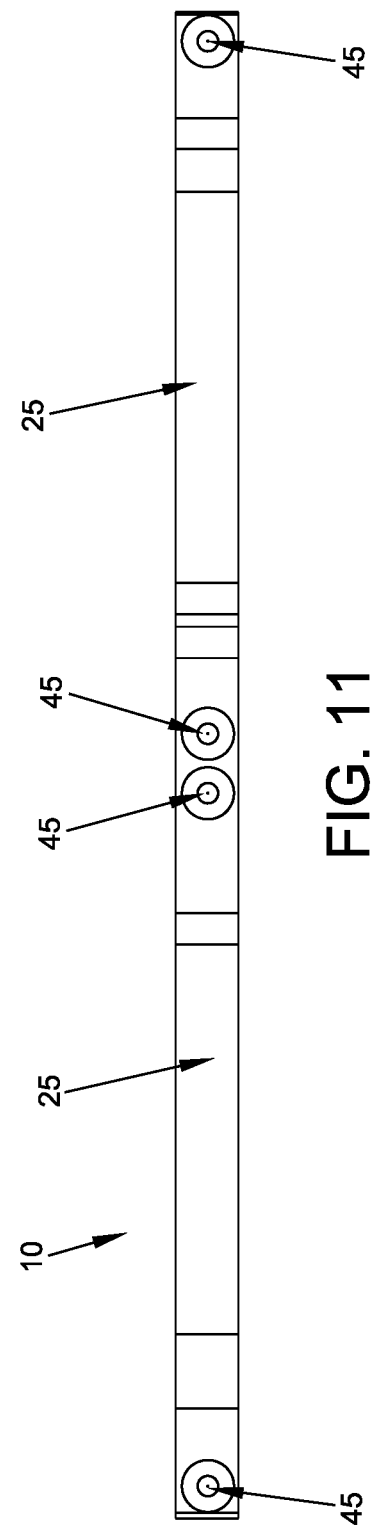

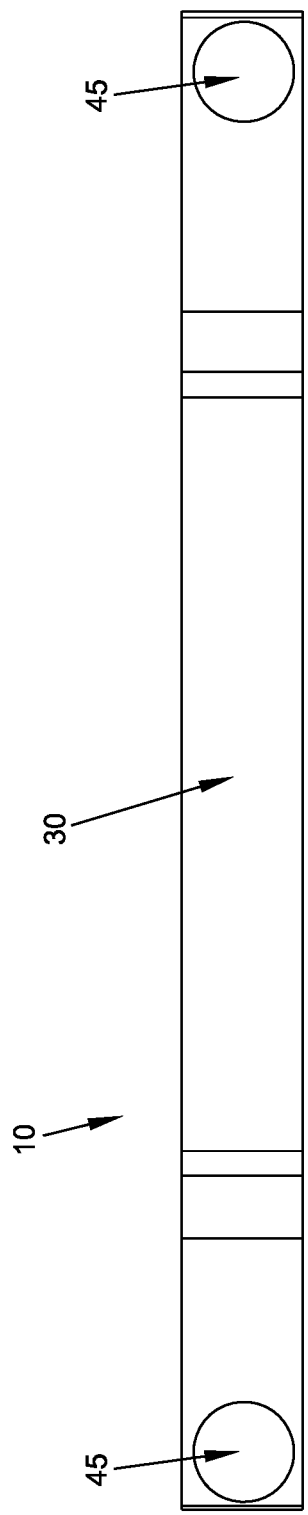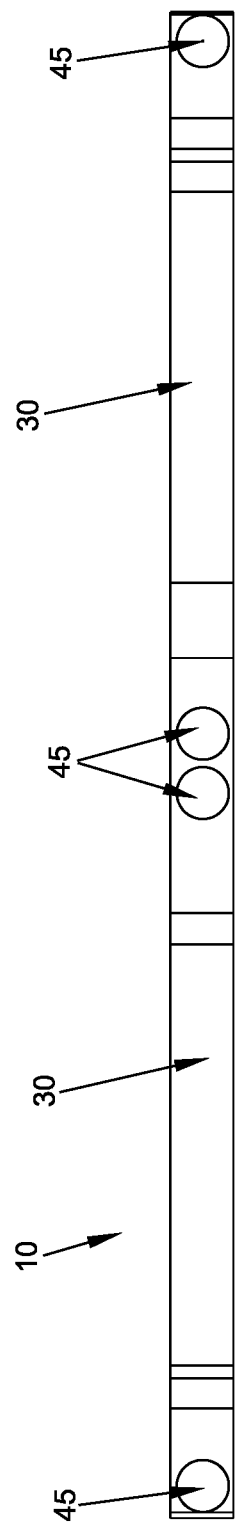

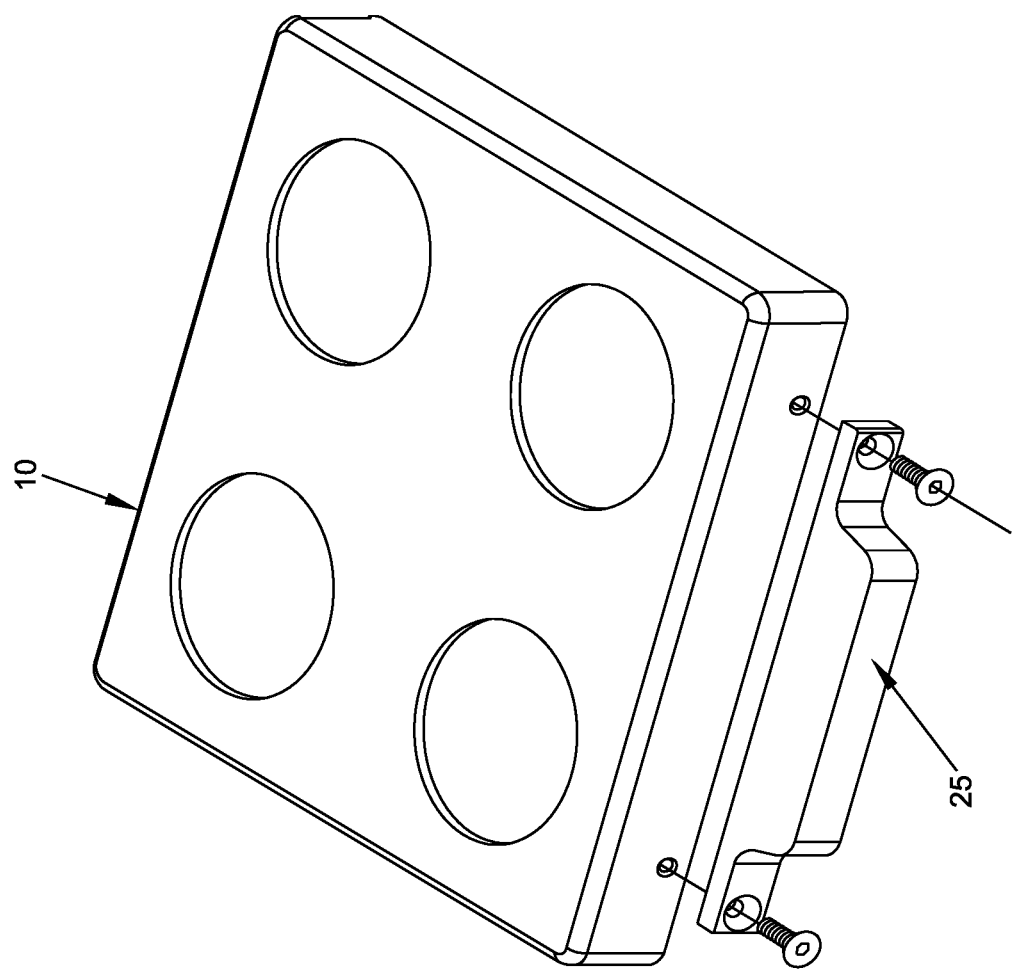

MODULAR FIXTURE PLATE SYSTEM FOR POSITIONING A WORKPIECE DURING A MANUFACTURING AND/OR INSPECTION PROCESS

REFERENCE TO PRIOR PATENT APPLICATIONS

This patent application is a continuation of pending prior U.S. patent application Ser. No. 16/251,923, filed Jan. 18, 2019 by Steven E. Phillips for MODULAR FIXTURE PLATE SYSTEM FOR POSITIONING A WORKPIECE DURING A MANUFACTURING AND/OR INSPECTION PROCESS, which patent application in turn is a continuation of prior U.S. patent application Ser. No. 14/195,607, filed Mar. 3, 2014 by Steven E. Phillips for MODULAR FIXTURE PLATE SYSTEM FOR POSITIONING A WORKPIECE DURING A MANUFACTURING AND/OR INSPECTION PROCESS, which in turn:

(i) claims benefit of prior U.S. Provisional Patent Application Ser. No. 61/771,575, filed Mar. 1, 2013 by Steven E. Phillips for LOC-N-LOAD(TM) MODULAR FIXTURE PLATE SYSTEM FOR INSPECTION MACHINES; and (ii) claims benefit of prior U.S. Provisional Patent Application Ser. No. 61/825,846, filed May 21, 2013 by Steven E. Phillips for LOC-N-LOAD™ MODULAR FIXTURE PLATE SYSTEM FOR REPEATABLE, LIGHT DUTY WORK.

The four (4) above-identified patent applications are hereby incorporated herein by reference.

FIELD OF THE INVENTION

This invention relates to methods and apparatus for manufacturing and/or inspection processes, and more particularly to methods and apparatus for positioning a workpiece during a manufacturing and/or inspection process.

BACKGROUND OF THE INVENTION

A number of manufacturing and/or inspection processes exist that require accurate, repeatable positioning of a workpiece. By way of example but not limitation, processes such as quality inspection, laser marking and etching, fiber laser and laser machining, dot peen marking, pad printing and routing all require accurate, repeatable positioning of a workpiece.

During a manufacturing process, a workpiece is typically held in a specific position while work is performed on the workpiece, and then the workpiece is "swapped out" for a new workpiece which is to be worked on. This new workpiece generally needs to be placed in the same, repeatable position as the preceding workpiece in order for the work process to be performed accurately.

In quality inspection processes, metal and/or plastic fixture plates are typically affixed to inspection machines to facilitate the quality inspection of previously-manufactured workpieces (i.e., to test the correctness of the manufactured workpieces). These fixture plates generally comprise a pattern of threaded holes formed therein which accept workpiece-holding elements such as screws, clamps, magnets, hold-downs, etc. In the quality inspection process, the previously-manufactured workpiece is placed on these metal and/or plastic fixture plates, held down with the workpiece-holding elements and then the previously-manufactured workpiece is measured for correctness. Once the workpiece on the fixture plate has been inspected, the workpiece is replaced by another workpiece which is to be inspected using the same inspection set-up, fixture plates, etc.

The aforementioned fixture plates are currently a one-piece design and are made to fit the workbed area of a particular inspection machine. As a result, different sizes of fixture plates must be provided for different inspection machines, thereby presenting an inventory issue or requiring long lead-times to custom manufacture fixture plates.

In addition to the foregoing, workpieces vary in size and, in many cases, a workpiece may be relatively small and take up only a small fraction of the complete surface area of the fixture plate provided for a given inspection machine. In this case, the remainder of the fixture plate is essentially unused during the quality inspection process.

In the same way that a quality inspection process applies very little force on a workpiece that is being inspected, the processes of laser marking and etching, fiber laser and laser machining, dot peen marking, pad printing, and routing also tend to apply little or no force to the workpiece.

In a manner similar to a quality inspection machine, these "light duty" manufacturing machines generally have a work surface on which the workpiece is supported during processing. By way of example but not limitation, the laser etching of part numbers on workpieces is a very common practice. Logo's, bar codes and/or other markings are also routinely added to workpieces.

For these reasons, it would be advantageous to provide a new and improved fixture plate system for positioning a workpiece during a quality inspection process and/or "light duty" manufacturing process, wherein the improved fixture plate system uses a modular approach to allow for the creation of simple but effective fixture assemblies that can provide fast, easy and repeatable setups for a specific production run.

SUMMARY OF THE INVENTION

The present invention provides a new and improved fixture plate system for positioning a workpiece during a quality inspection process and/or "light duty" manufacturing process, wherein the improved fixture plate system uses a modular approach to allow for the creation of simple but effective fixture assemblies that can provide fast, easy and repeatable setups for a specific production run.

In one preferred form of the invention, there is provided a modular fixture plate system comprising:

at least one interlocking fixture plate comprising at least one of a male end and a female end, wherein the male end comprises at least one male projection and the female end comprises at least one female recess; and a docking plate comprising at least one of at least one male projection and at least one female recess;

wherein at least one male projection or female recess of the at least one interlocking fixture plate is interlocked with a mating one of the at least one male projection or the at least one female recess of the docking plate.

In another preferred form of the invention, there is provided an interlocking fixture plate comprising:

a surface for receiving a workpiece;
a male end comprising at least one male projection; and
a female end comprising at least one female recess.

In another preferred form of the invention, there is provided a method for positioning a workpiece during a manufacturing and/or inspection process, the method comprising:

providing a modular fixture plate system comprising:
at least one interlocking fixture plate comprising at least one of a male end and a female end, wherein the male end comprises at least one male projection and the female end comprises at least one female recess; and a docking plate comprising at least one of at least one male projection and at least one female recess;

interlocking at least one male projection or female recess of the at least one interlocking fixture plate with a mating one of the at least one male projection or at least one female recess of the docking plate so as to stabilize the at least one interlocking fixture plate relative to the docking plate; and positioning a workpiece on the at least one interlocking fixture plate.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIGS. 10-13 are schematic views showing how magnets may be mounted to interlocking fixture plates;

FIGS. 32 and 33 are schematic views showing how an interlocking fixture plate may be formed out of a conventional fixture plate and an "add on" male projection.

DETAILED DESCRIPTION OF THE PREFERRED EMBODIMENTS

The present invention provides a new and improved fixture plate system for positioning a workpiece during a quality inspection process and/or "light duty" manufacturing process, wherein the improved fixture plate system uses a modular approach to allow for the creation of simple but effective fixture assemblies that can provide fast, easy and repeatable setups for a specific production run.

Among other things, the present invention comprises a new modular fixture plate system which allows for, and encourages, lean manufacturing principles for, but not limited to, quality inspection processes and "light duty" manufacturing processes such as laser marking and etching, fiber laser and laser machining, dot peen marking, pad printing and routing processes. More particularly, the present invention comprises a modular fixture plate system which comprises a plurality of interlocking plates which are selected, and then assembled together, so as to form a complete fixture plate, or which can be used individually so as to allow a portion of the workbed area of the inspection or manufacturing machine to be exposed, with the specific interlocking plates used being selected according to the size of the workpiece which is to be held, so that only those interlocking plates are used which are required to hold the workpiece of interest. Or, in another aspect of the present invention, a workpiece may be set up and programmed for inspection or working on a single interlocking plate, which can then be easily positioned on the inspection or manufacturing machine, the workpiece inspected or worked, then the workpiece and interlocking plate may be removed as a unit from the workbed of the inspection or manufacturing machine and thereafter be replaced by another workpiece and interlocking plate. The new modular fixture plate system of the present invention encourages inspectors and machine operators to employ lean manufacturing principles in the inspection and "light duty" manufacturing processes, using the minimum resources required, and enhances the value and investment of the inspection and "light duty" manufacturing equipment.

Figure 1:
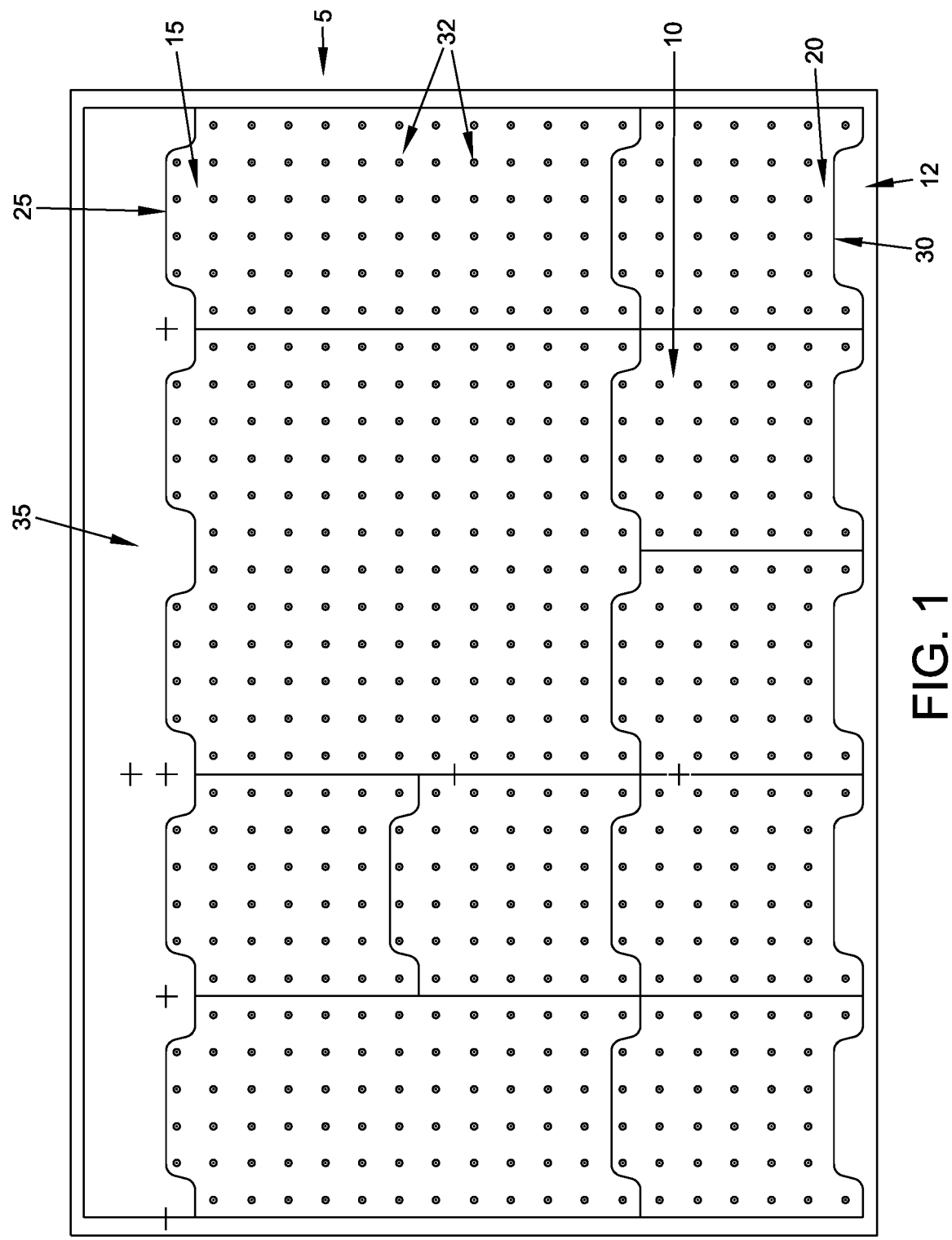
FIGS. 1 and 2 are schematic views showing a novel modular fixture plate system formed in accordance with the present invention.
Figure 2:
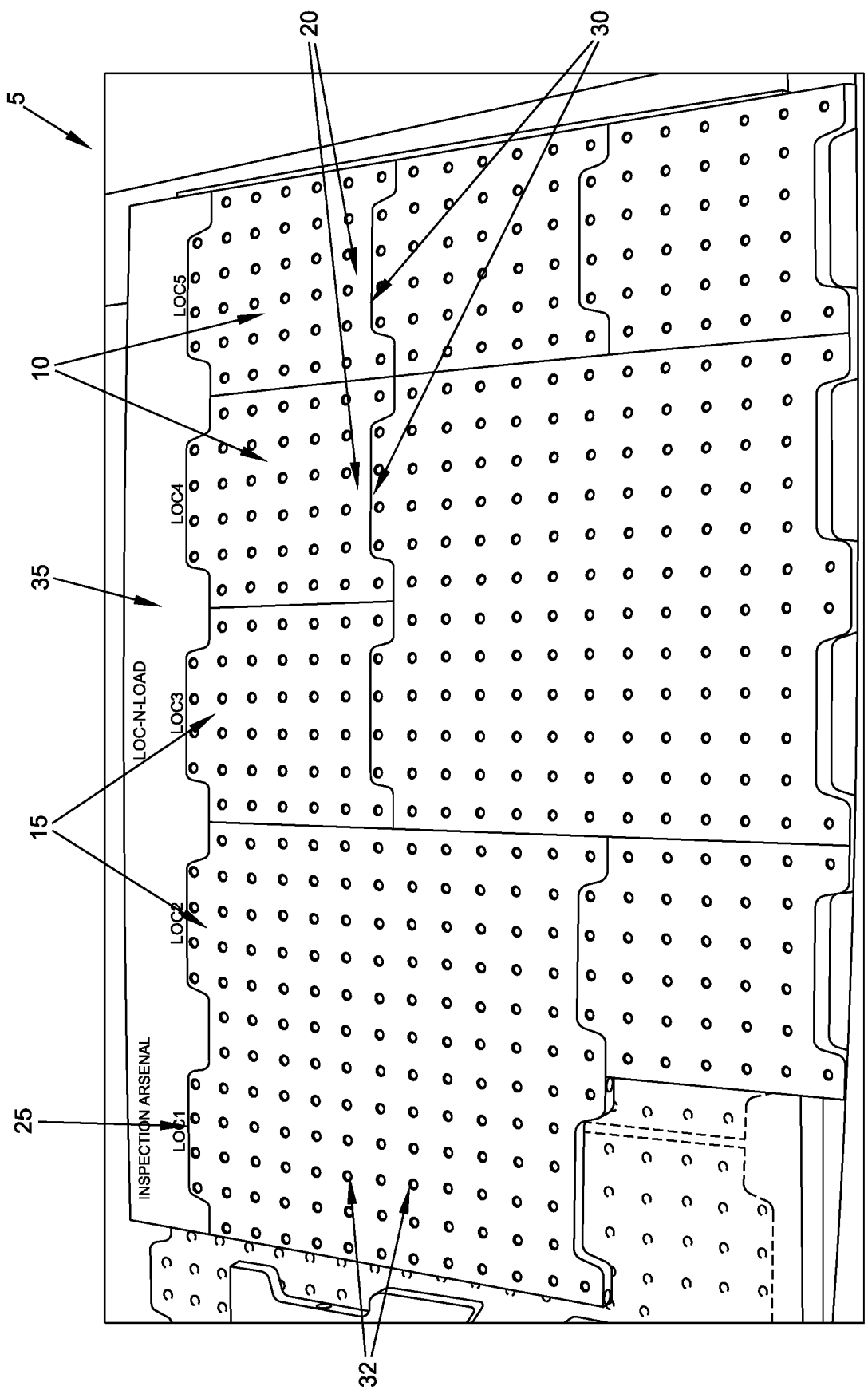
Figure 3:
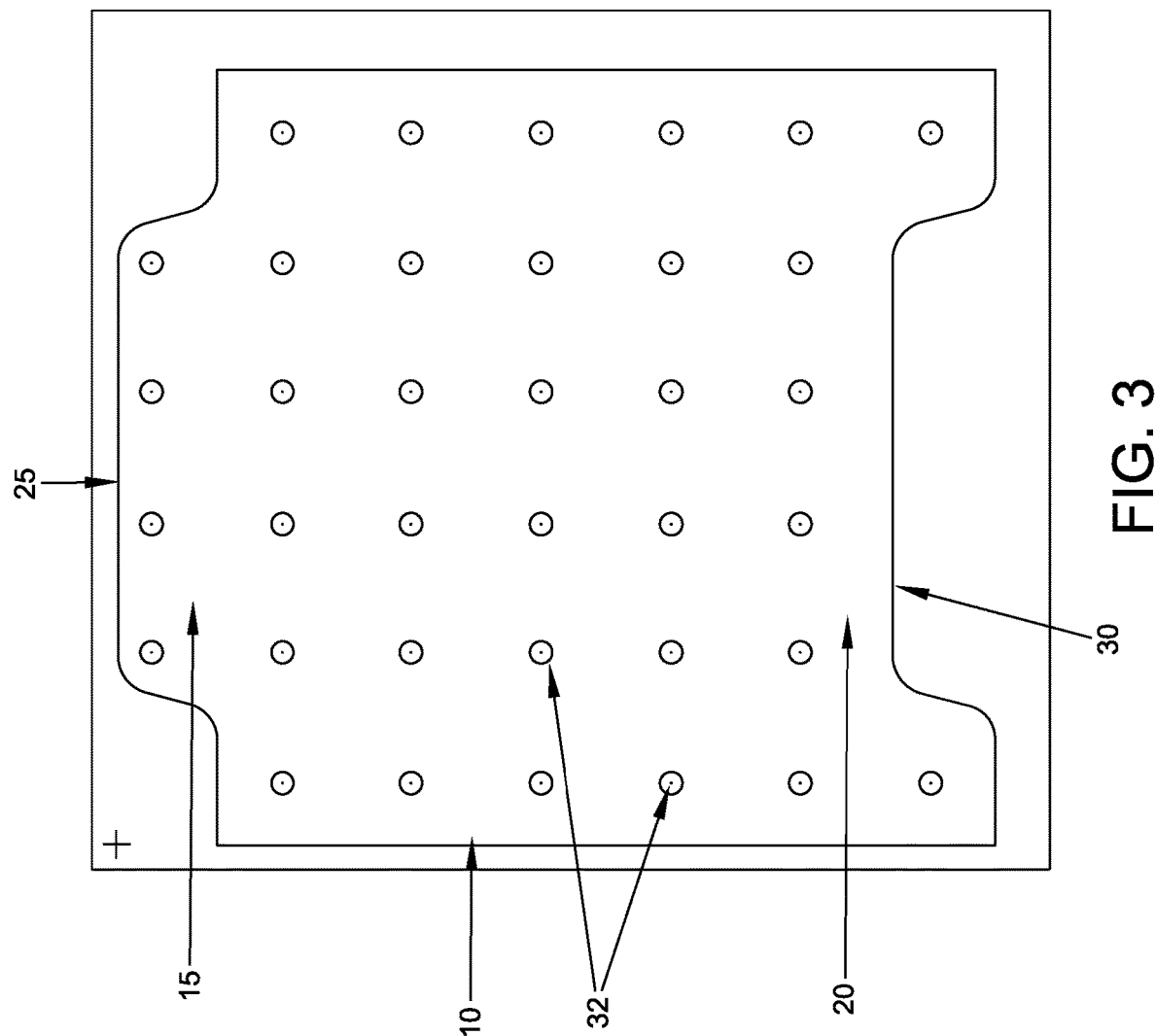
FIGS. 3-6 are schematic views showing various interlocking fixture plates formed in accordance with the present invention.
Figure 4:
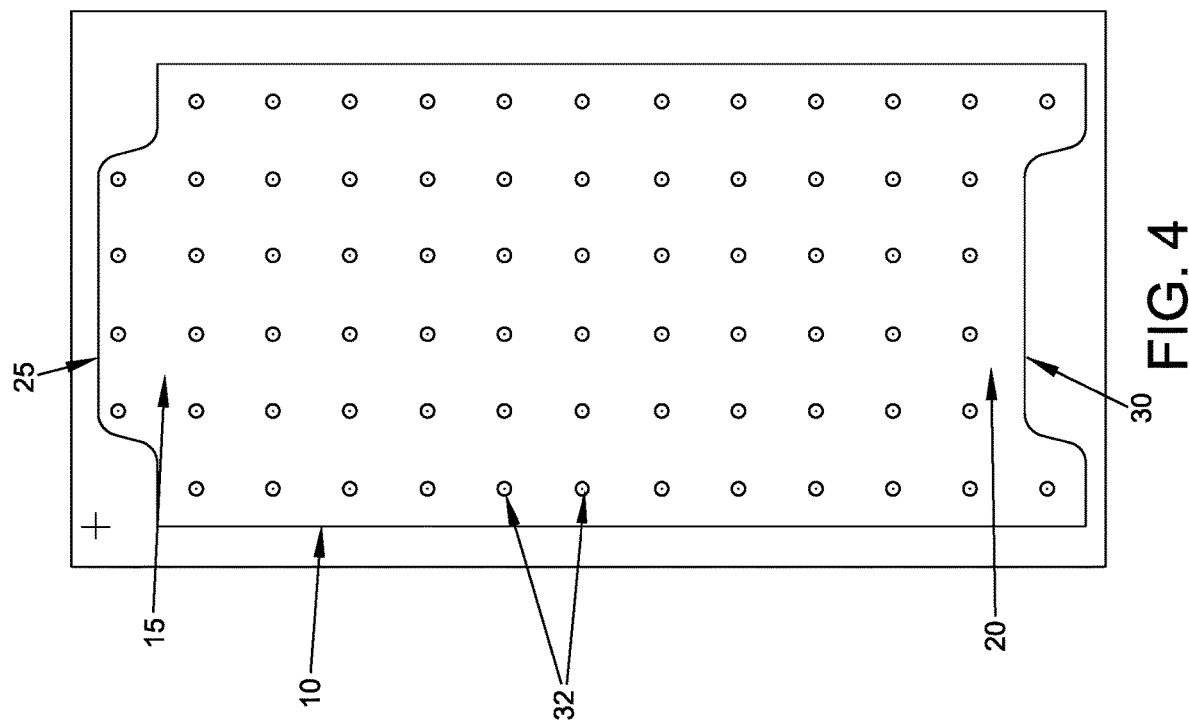
Figure 5:
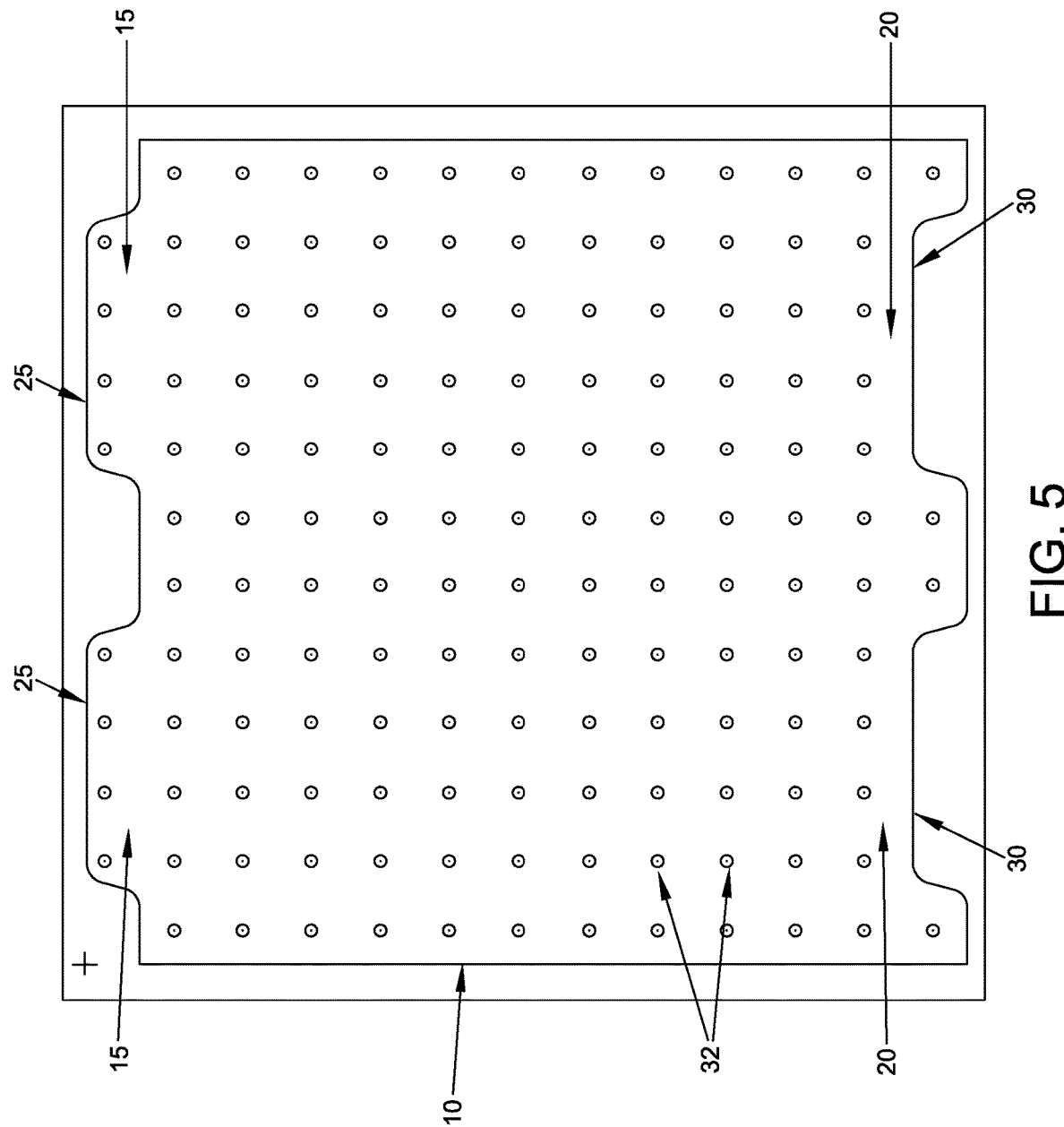
Figure 6:
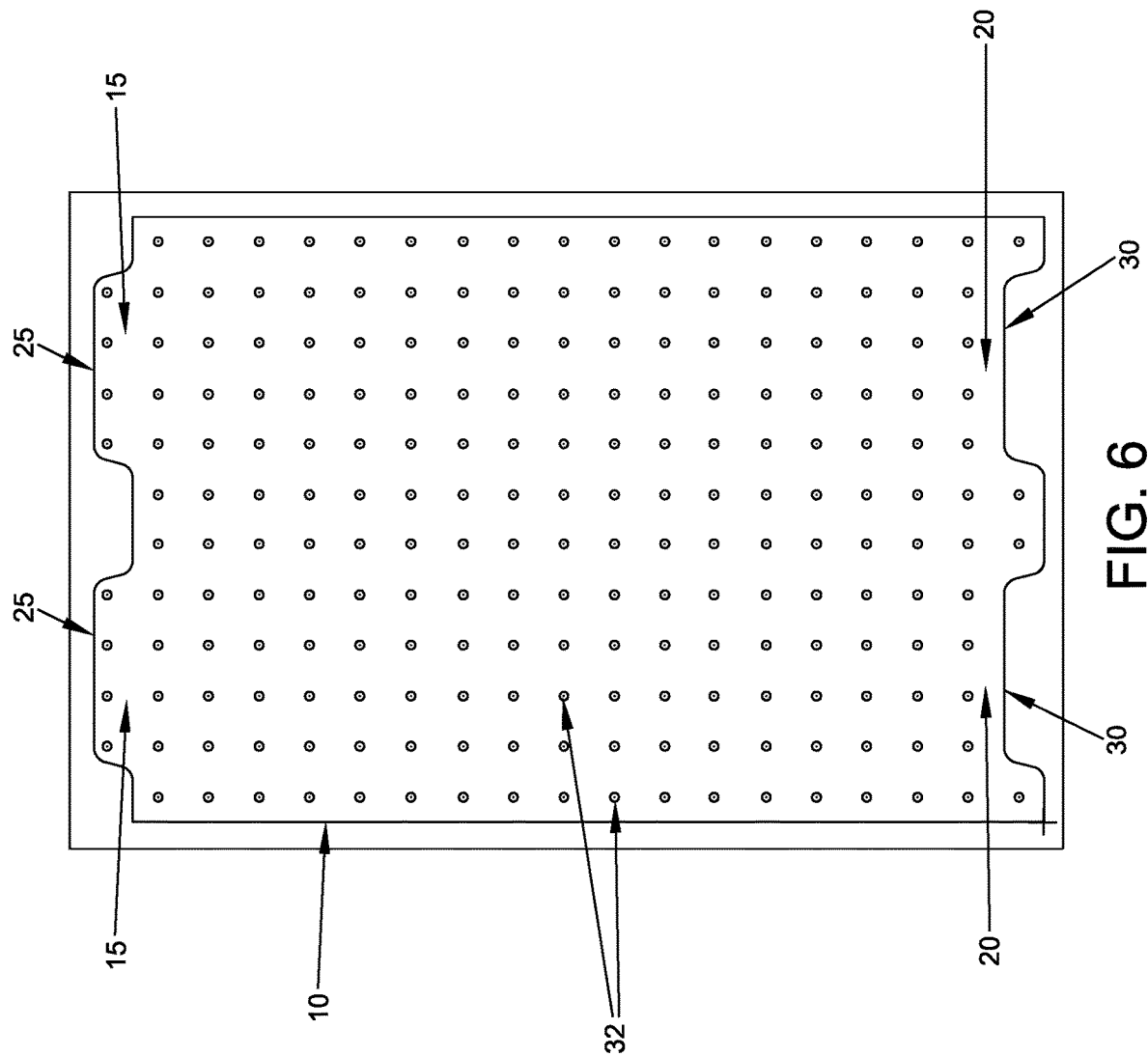

Looking first at FIGS. 1 and 2, there is shown a new modular fixture plate system 5 formed in accordance with the present invention. Modular plate system 5 generally comprises one or more interlocking fixture plates 10 which are intended to be positioned on the workbed 12 of an inspection or "light duty" manufacturing machine. Each interlocking fixture plate 10 comprises a male end 15 and a female end 20, wherein male end 15 comprises at least one male projection 25 and female end 20 comprises at least one female recess 30. Preferably interlocking fixture plates 10 comprise a plurality of threaded holes 32, preferably disposed in a regular pattern, for accepting workpiece-holding elements well known in the art, e.g., screws, clamps, magnets, hold-downs, etc. As seen in FIGS. 1-6 interlocking fixture plates 10 can be formed in a variety of configurations, each with one or more male projections 25 and one or more female recesses 30.

Figure 7:
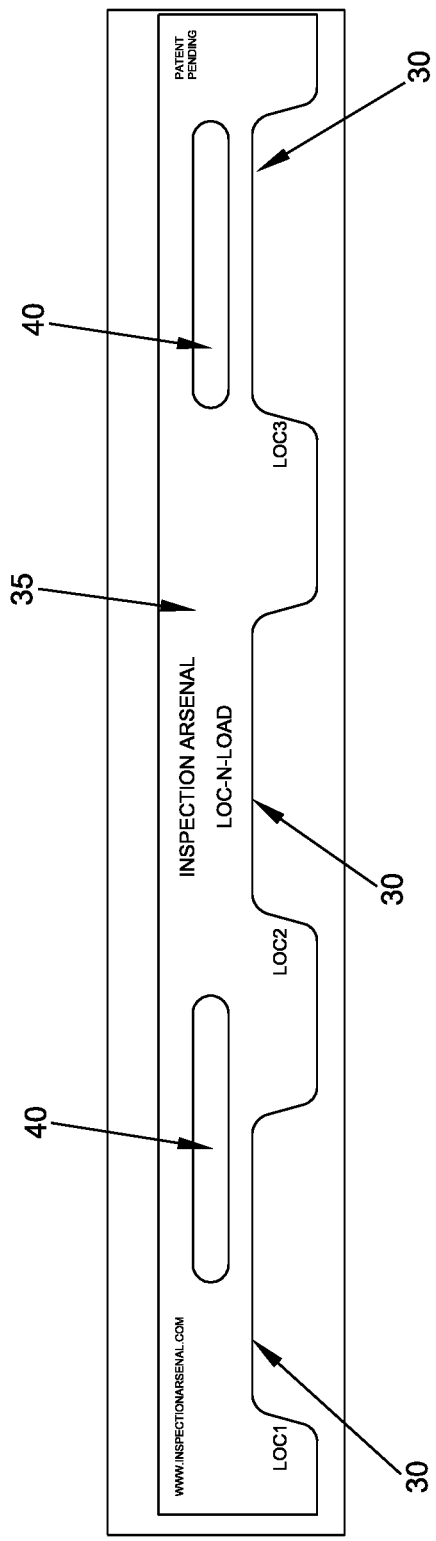
FIGS. 7 and 8 are schematic views showing various docking plates formed in accordance with the present invention.
Figure 8:
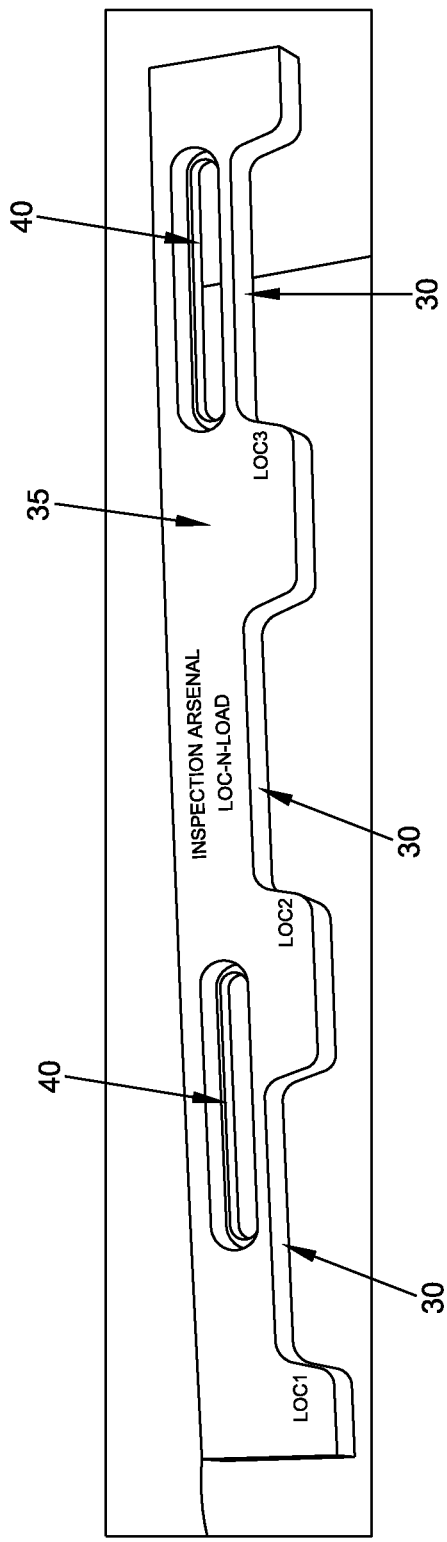
Figure 9:
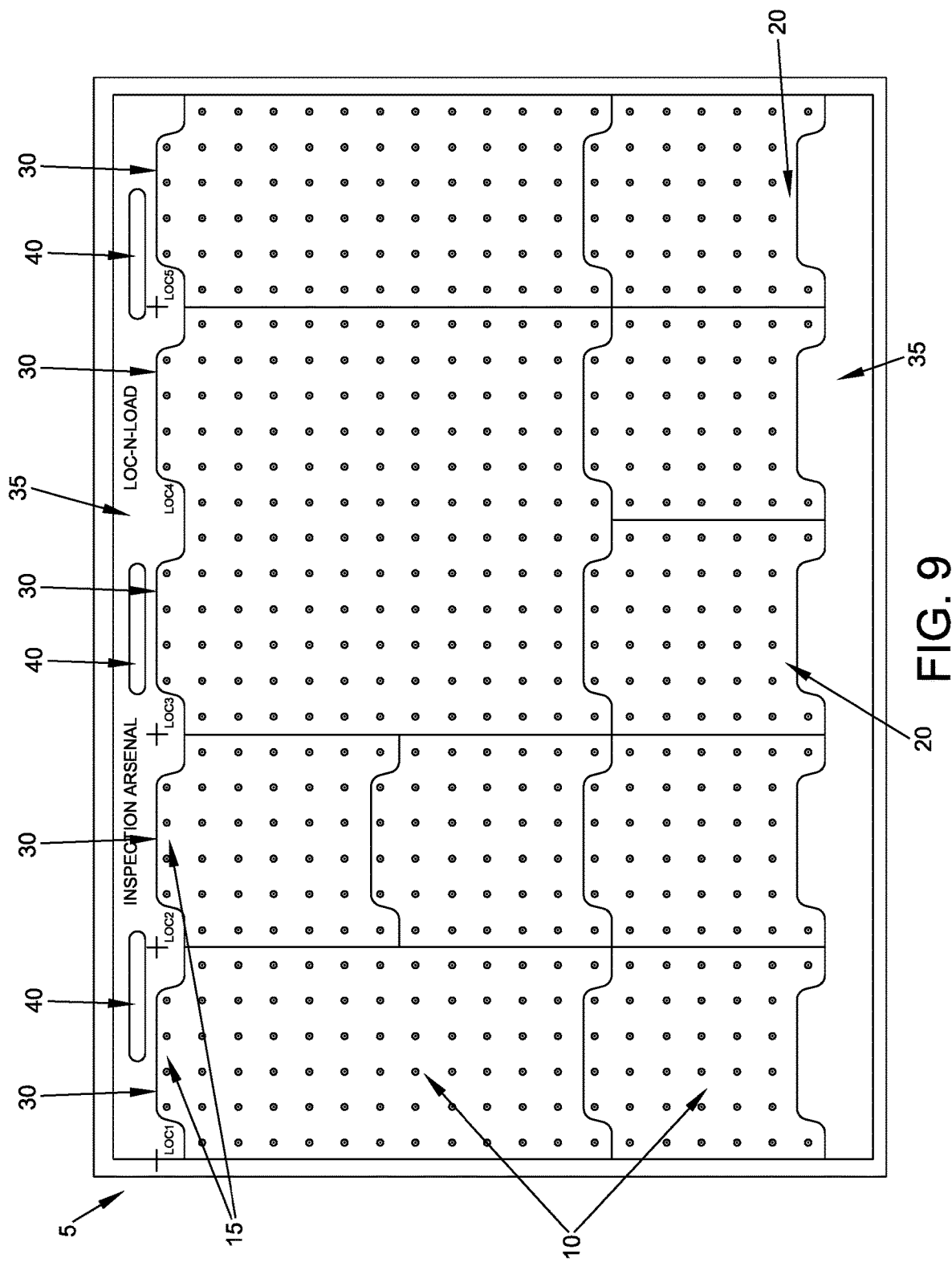
FIG. 9 is a schematic view showing another novel modular fixture plate system formed in accordance with the present invention.

Modular plate system 5 also comprises a docking plate 35 (FIGS. 1, 2, 7 and 8) which is intended to be affixed to the workbed of the inspection or "light duty" manufacturing machine, e.g., using an adhesive in which case the docking plate may comprise a solid structure (FIGS. 1 and 2) or using bolts which extend through counterbored slots 40 formed in docking plate 35 (FIGS. 7 and 8). Docking plate 35 comprises a plurality of female recesses 30 (FIGS. 1, 2, 7 and 8), also sometimes referred to herein as "Locations" or "LOCs", which receive male projections 25 of one or more interlocking fixture plates 10 or, alternatively, docking plate 35 comprises a plurality of male projections 25 for projecting into female recesses 30 of one or more interlocking fixture plates 10 (FIG. 9).

Docking plate 35 and the various interlocking fixture plates 10 are designed to fit tightly together in an interlocked manner, with a male projection 25 of one element being received in a female recess 30 of another element. By way of example but not limitation, where docking plate 35 comprises a plurality of female recesses 30 (FIGS. 1, 2 and 9), a plurality of interlocking fixture plates 10 may be interlocked with docking plate 35, and also with one another, by projecting the male projections 25 of some of the interlocking fixture plates 10 into the female recesses 30 of docking plate 35 and by projecting the male projections 25 of others of the interlocking fixture plates 10 into the female recesses 30 of the interlocking fixture plates 10 interlocked with docking plate 35. By way of further example but not limitation, a docking plate 35 having a plurality of male projections 25 may be interlocked with interlocking fixture plates 10 by projecting the male projections of docking plate 35 into the female recesses of interlocking fixture plates 10 (FIG. 9).

Thus it will be seen that with fixture plate system 5, a plurality of interlocking fixture plates 10 can be interlocked with one another, and with docking plate 35, so as to cover some or all of the workbed of an inspection or manufacturing machine, and a large workpiece can span a number of interlocked fixture plates 10. In other words, with the present invention, interlocking fixture plates 10 fit together (e.g., in the manner of a jigsaw puzzle) to collectively create the desired overall size for the fixture plate.

Figure 14:
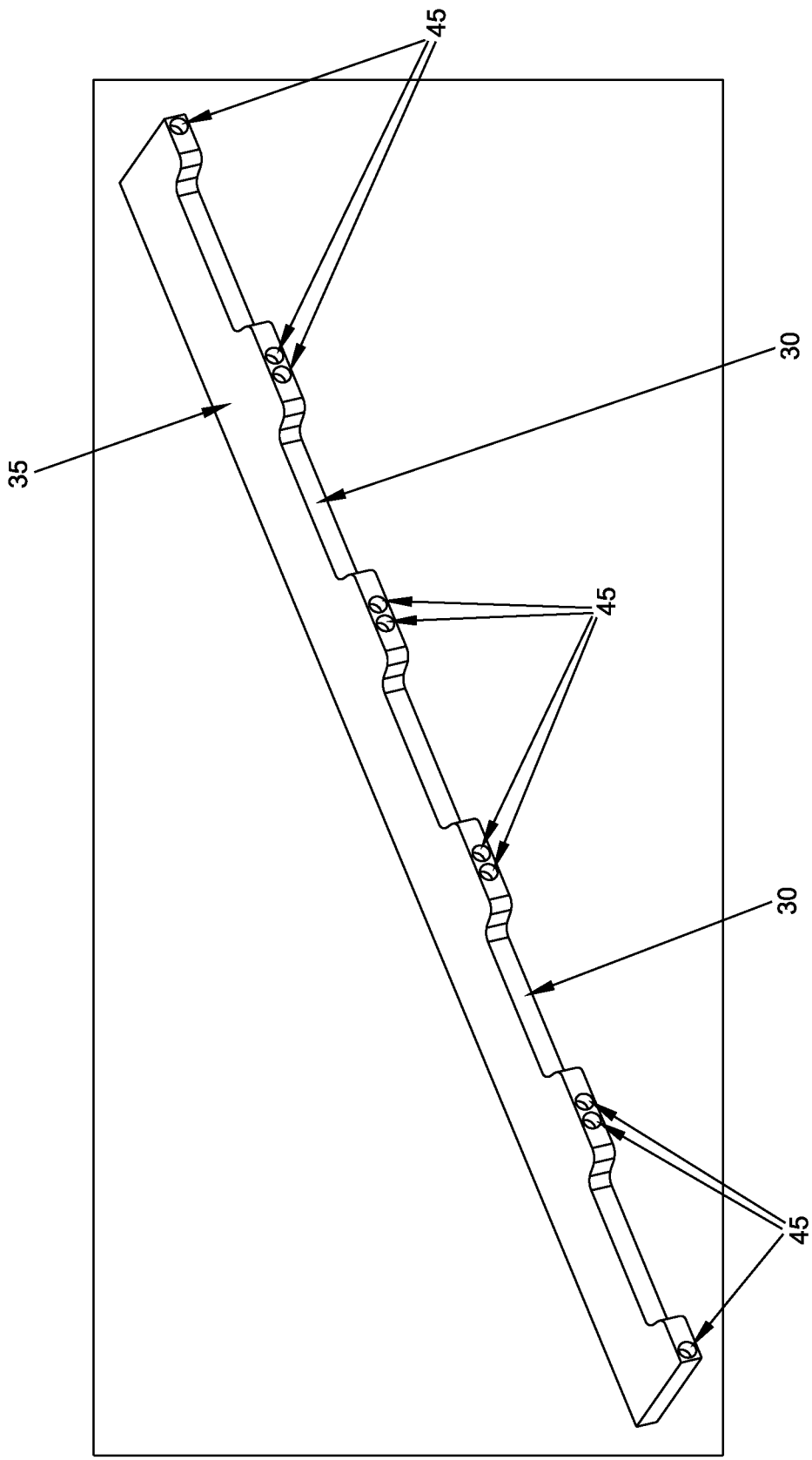
FIGS. 14-16 are schematic views showing how magnets may be mounted to a docking plate.
Figure 15:
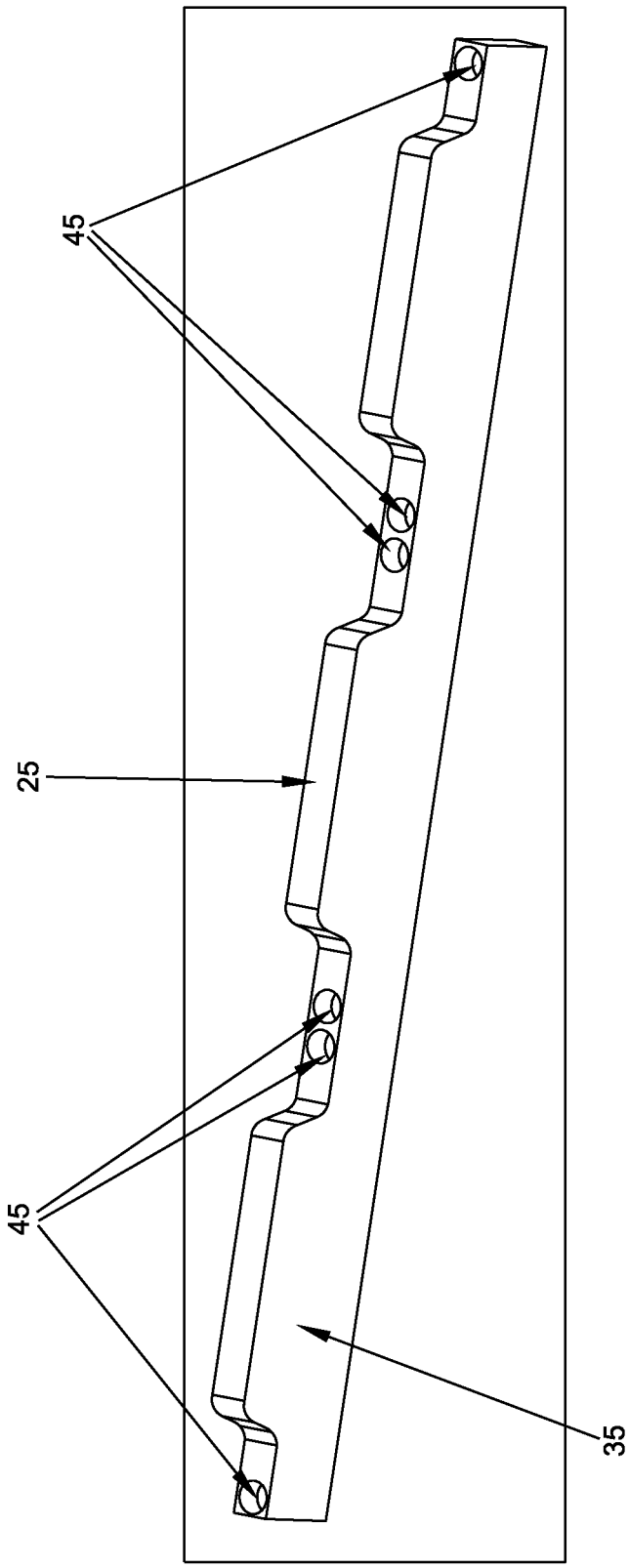
Figure 16:
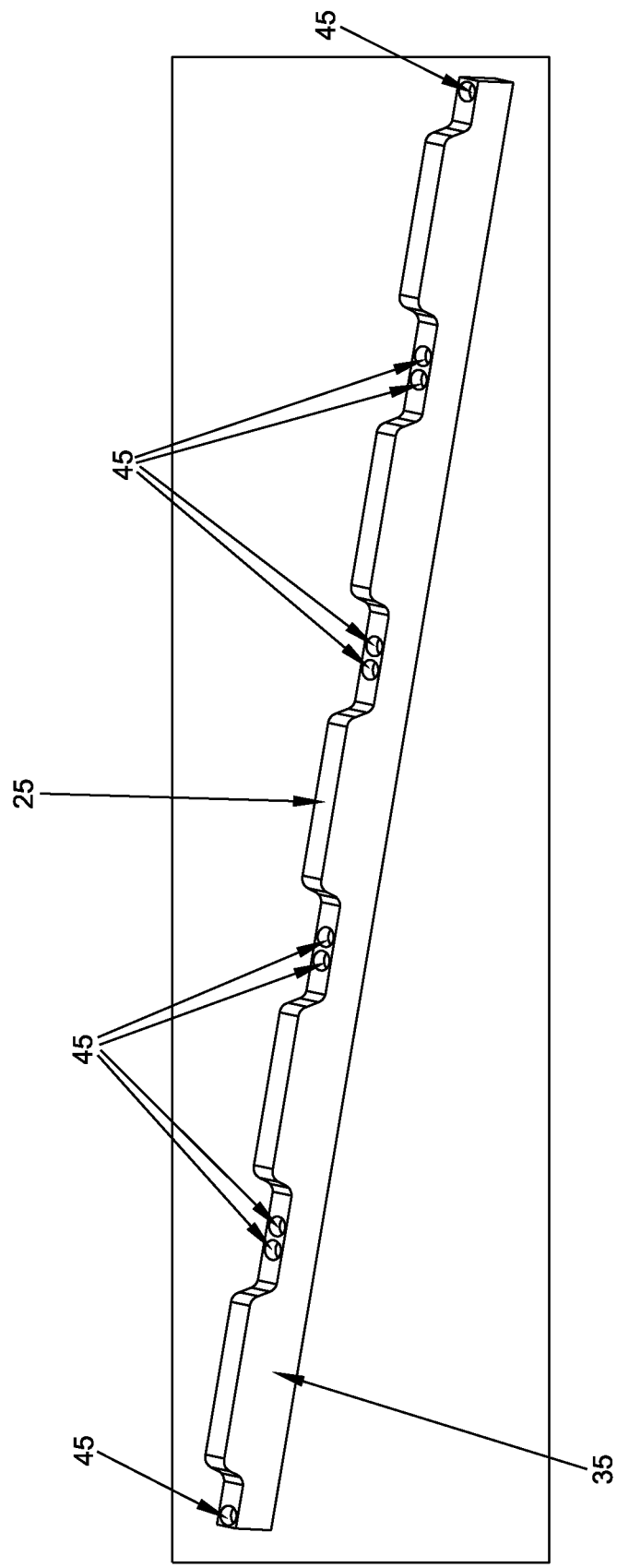

Preferably docking plate 35 and the various interlocking fixture plates 10 are further secured to one another by magnets 45 which are disposed adjacent to male projections 25 of interlocking fixture plates 10 (FIGS. 10 and 11) and adjacent to female recesses 30 of interlocking fixture plates 10 (FIGS. 12 and 13), and by magnets 45 which are disposed adjacent to female recesses 30 of docking plate 35 (FIG. 14) and adjacent to male projections 25 of docking plate 35 (FIGS. 15 and 16). Preferably magnets 45 are inset into docking plate 35 and interlocking fixture plates 10 so that the magnets of one plate mate with the magnets of an adjoining plate when a male projection 25 is received in a female recess 30. Using magnets 45 to secure docking plate 35 and interlocking fixture plates 10 to one another allow interlocking fixture plates 10 to be easily released from one another, and from docking plate 35, by hand and without the use of tools, whereby to enable interlocking fixture plates 10 to be quickly and easily swapped out as needed.

Alternatively, if desired, other means (e.g., a spring plunger set screw) may be used to secure docking plate 35 and the various interlocking fixture plates 10 to one another.

Or, if desired, two or more docking plates 35 may be used in opposing arrangement (FIG. 9) so as to lock the interlocking fixture plates 10 in position.

Figure 17:
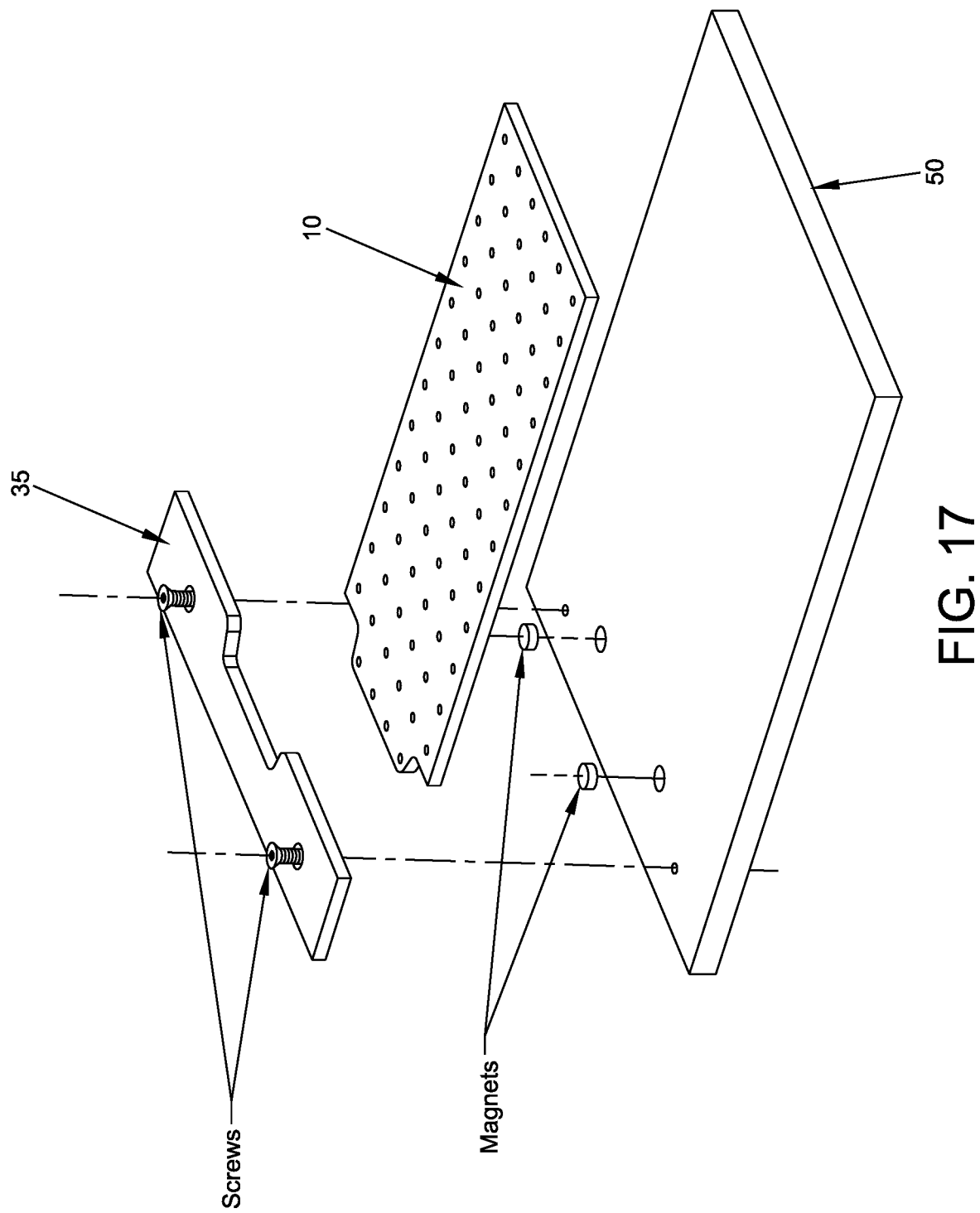
FIG. 17 is a schematic view showing how the novel modular fixture plate system may include a base plate.

Since many "light duty" manufacturing machines (e.g., laser engraving machines and the like) are not necessarily sold with a workbed surface, modular fixture plate system 5 may also comprise a base plate 50 (FIG. 17) on which the remainder of the system (e.g., docking plate 35 and one or more interlocking fixture plates 10) may be mounted.

For some "light duty" manufacturing machines (e.g., workpiece marking machines), one preferred form of the invention may provide an interlocking fixture plate 10 which interlocks with only docking plate 35 (FIG. 17), with the opposite end of interlocking fixture plate 10 being straight and with or without a handle or finger grip for easier removal of interlocking fixture plate 10.

Alternatively, modular plate system 5 may provide docking plates 35 on all sides of interlocking fixture plates 10 so that the interlocking fixture plates 10 are interlocked, much like the pieces of a puzzle. In this case, the aforementioned magnets 45 can be omitted.

Figure 18:
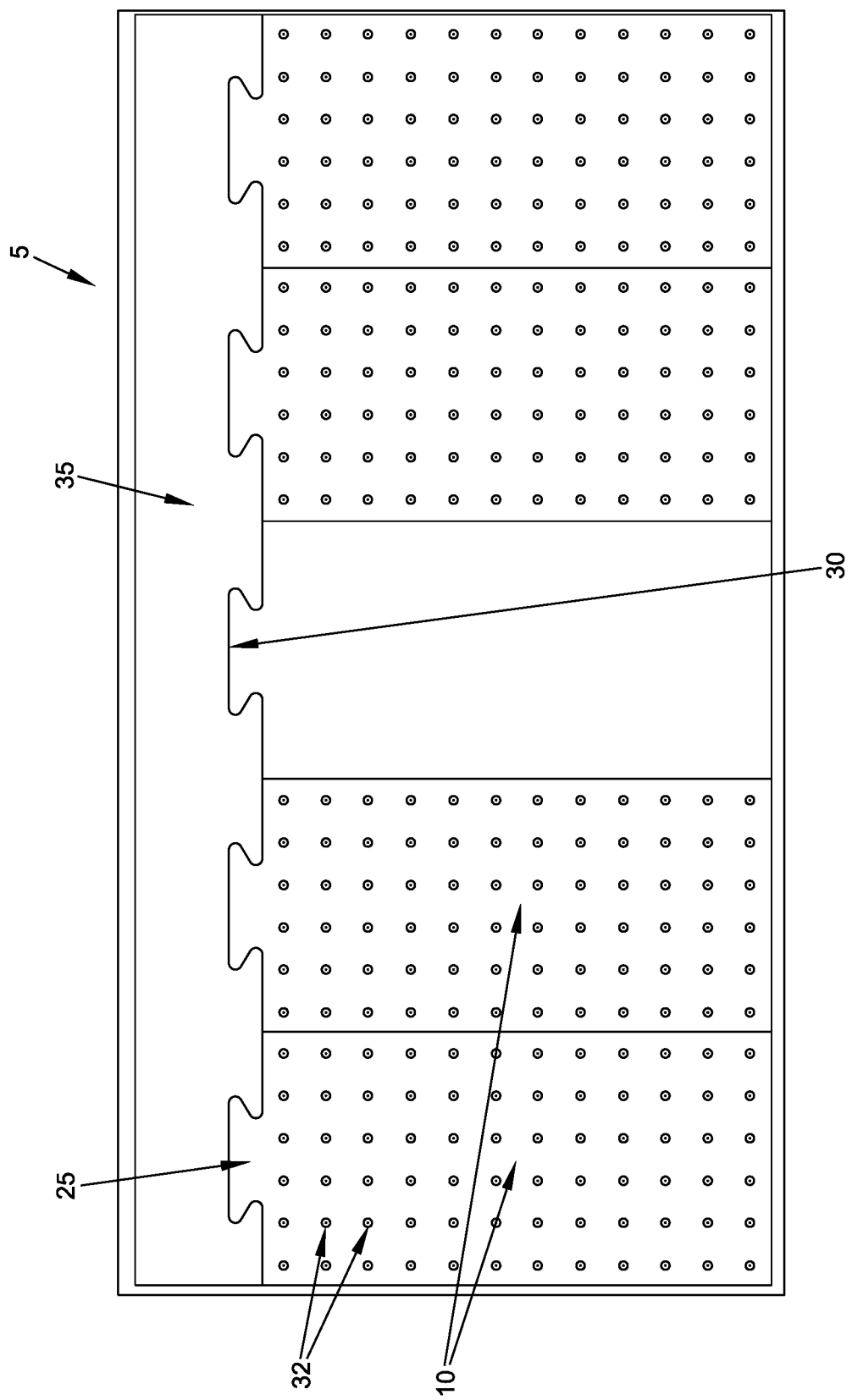
FIGS. 18-20 show how the male projections and female recesses of the interlocking fixture plates and the docking plate may be formed with a dovetail configuration.
Figure 19:
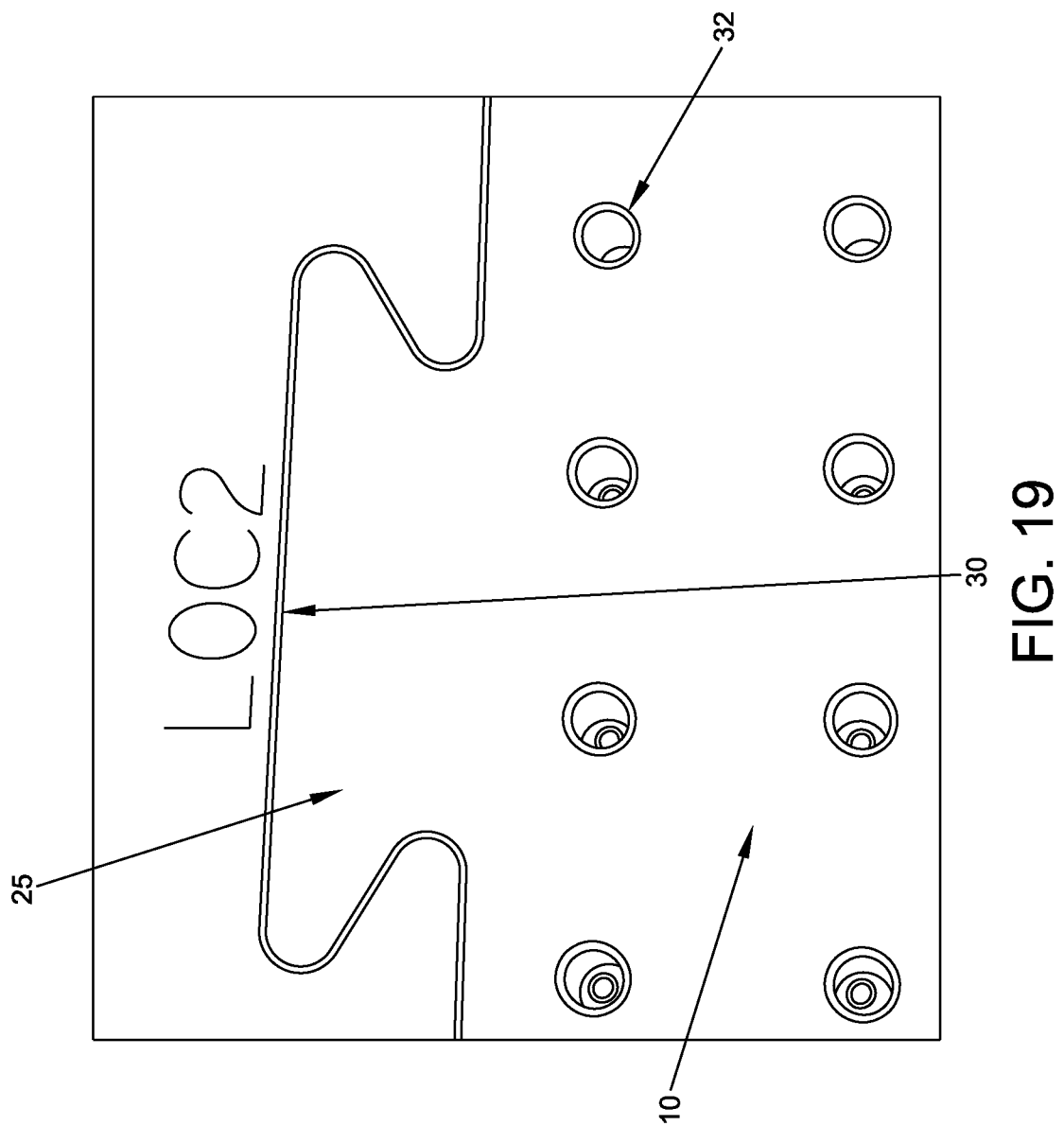
Figure 20:
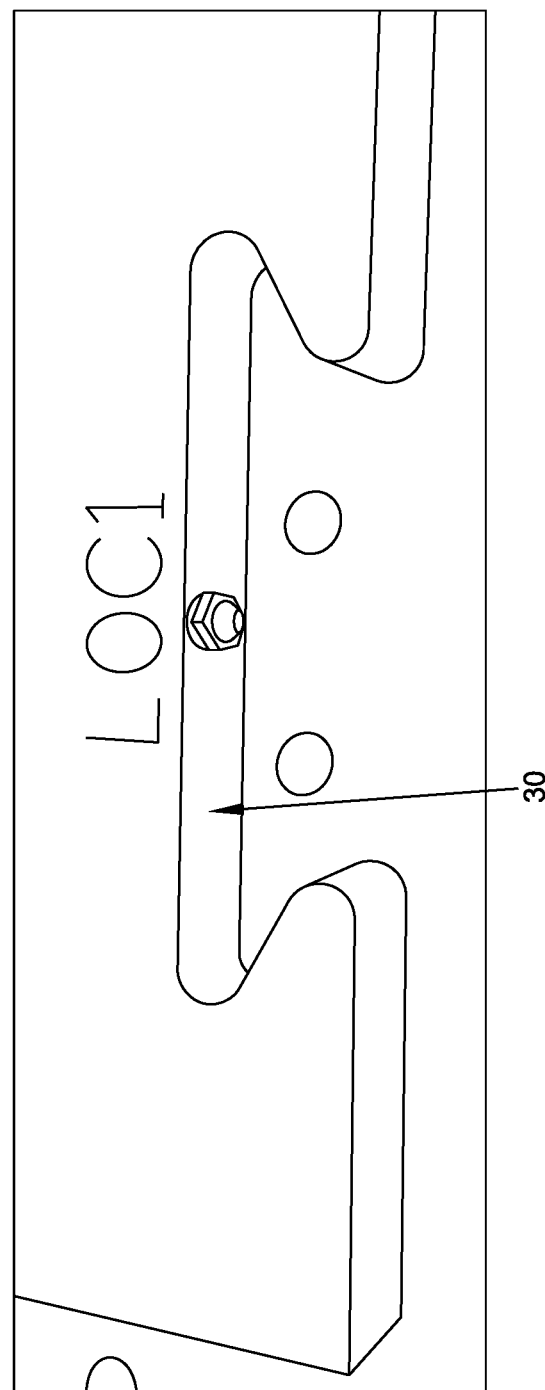
Figure 21:
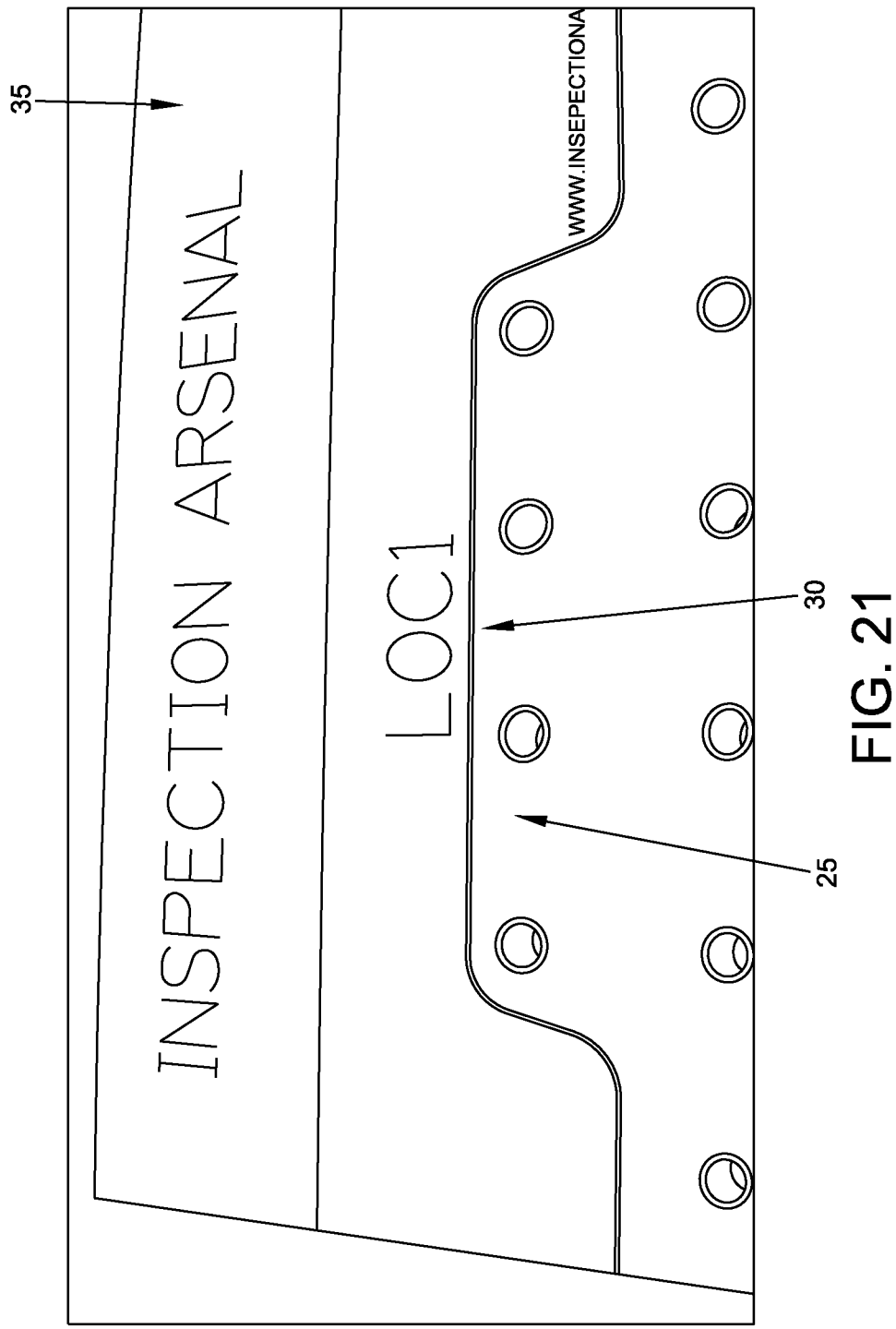
FIG. 21 is a schematic view showing how the interface of a male projection and a female recess may be given a unique "Location" or "LOC" number.

In still another form of the present invention, male projections 25 and female recesses 30 may utilize a dovetail configuration (FIGS. 18-20).

It should be appreciated that each of the interlocks of an interlocking fixture plate 10 with a docking plate 35 (i.e., a male projection 25 fitting into a female recess 30) can be assigned a "Location" or "LOC" number (see FIGS. 2, 7, 9, 20 and 21). Inspection and manufacturing programs can be written and assigned to a specific "Location" or "LOC" number, i.e., to a specific location of an interlocking fixture plate 10 relative to docking plate 35. Programming inspection and manufacturing setups based on the interlocking fixture plate location or assignment allows for faster repeat setups and allows for more than one setup per machine (i.e., it permits work to be effected at LOC1, LOC2, LOC3, etc.), thereby speeding up the inspection and manufacturing processes.

The hole pattern (i.e., the pattern of the holes 32 provided in interlocking fixture plates 10) is preferably consistent and seamless across all interlocking fixture plates 10 (FIGS. 1 and 2). By way of example but not limitation, a ¼–20 or M6 Threaded hole pattern with 1 inch spacing is shown in FIGS. 1 and 2. The described thread and hole pattern is typical of the industry, however, it can vary widely in thread size and hole spacing without departing from the scope of the present invention. In one form of the present invention, interlocking fixture plates 10 can be created as "blanks" (i.e., without holes 32) so that the end user can then add the holes 32 in the sizes and/or patterns desired.

Figure 22:
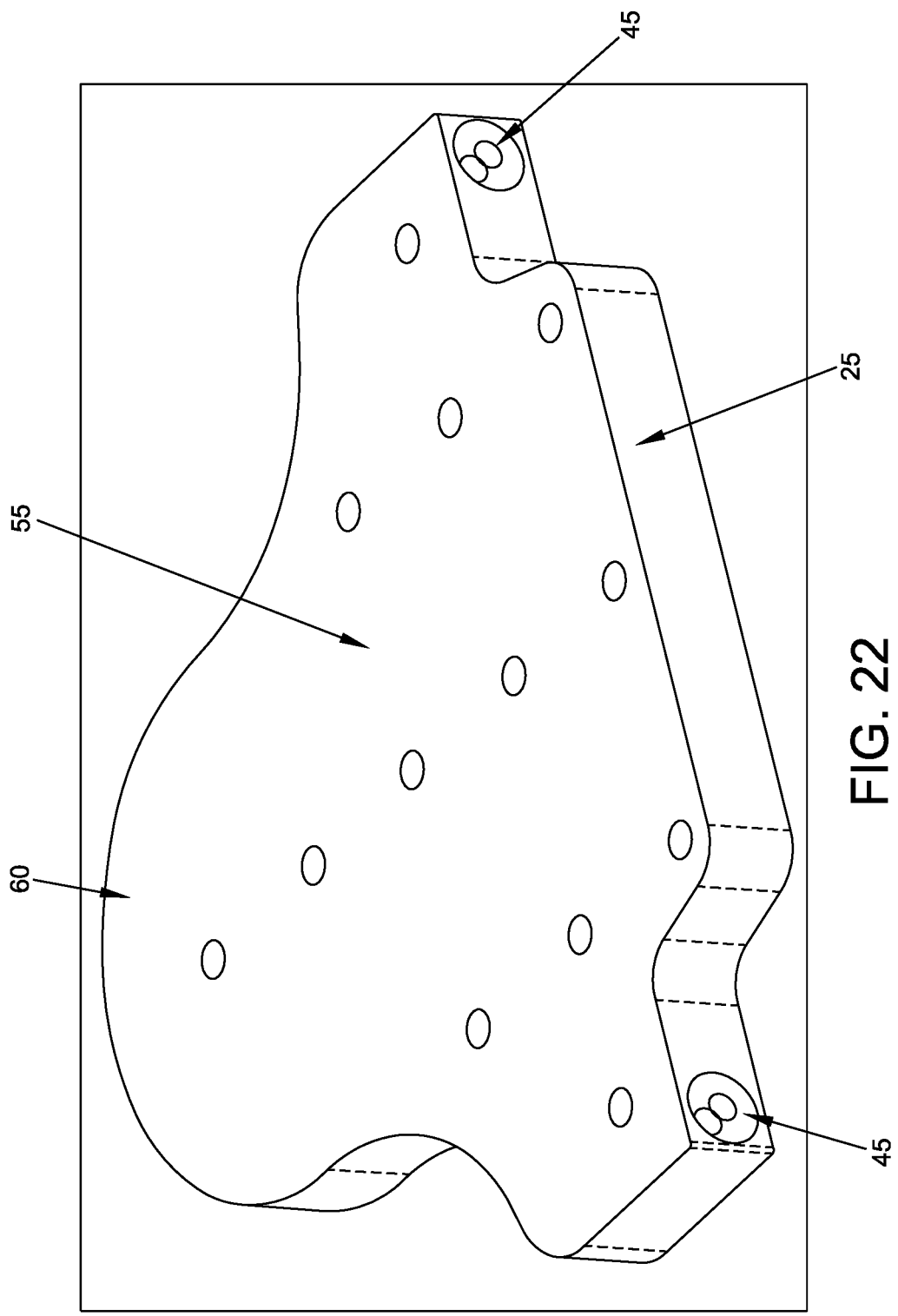
FIGS. 22-27 are schematic views showing how the novel modular fixture plate system may include a removable qualifying ball plate.
Figure 23:
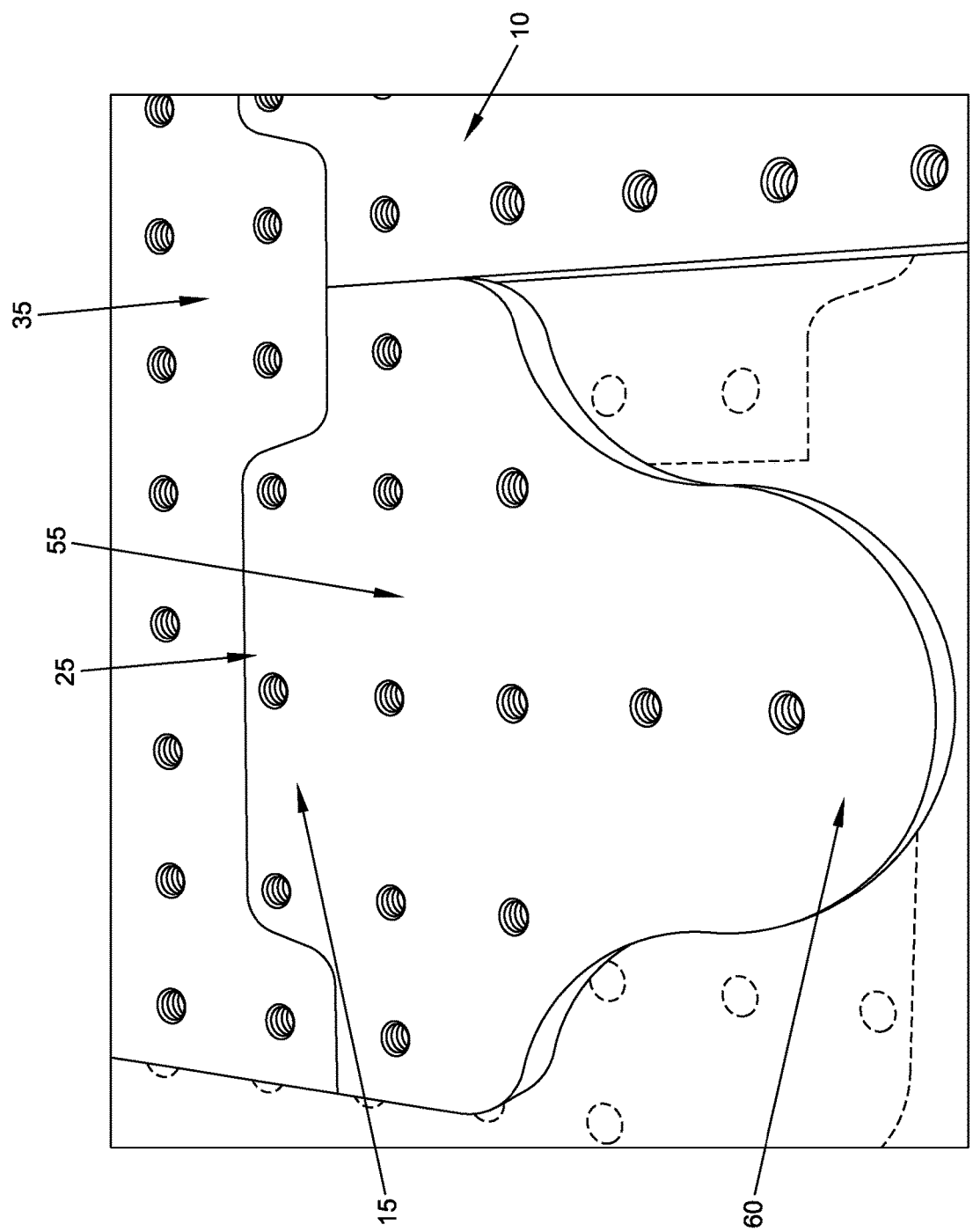
Figure 24:
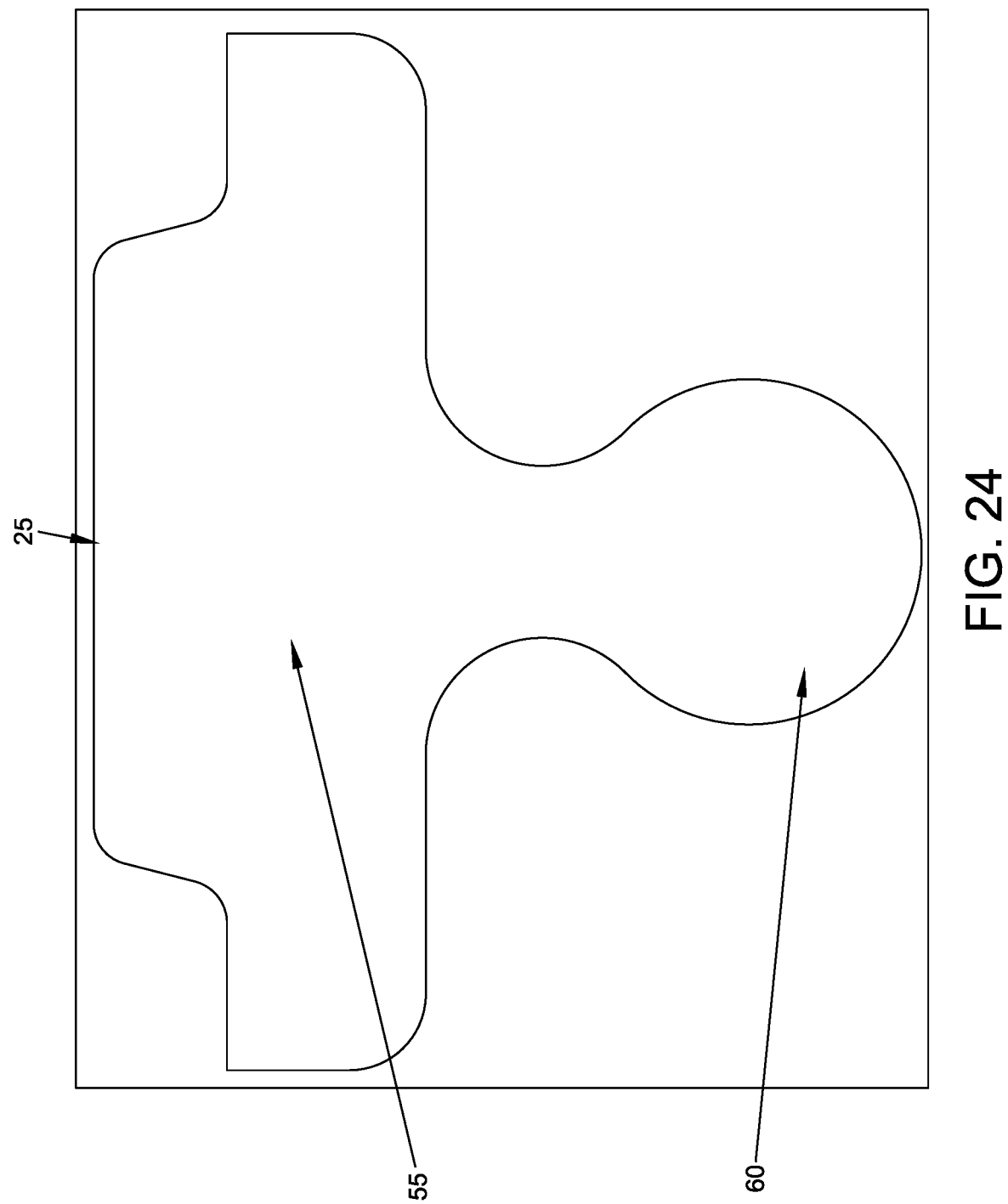
Figure 25:
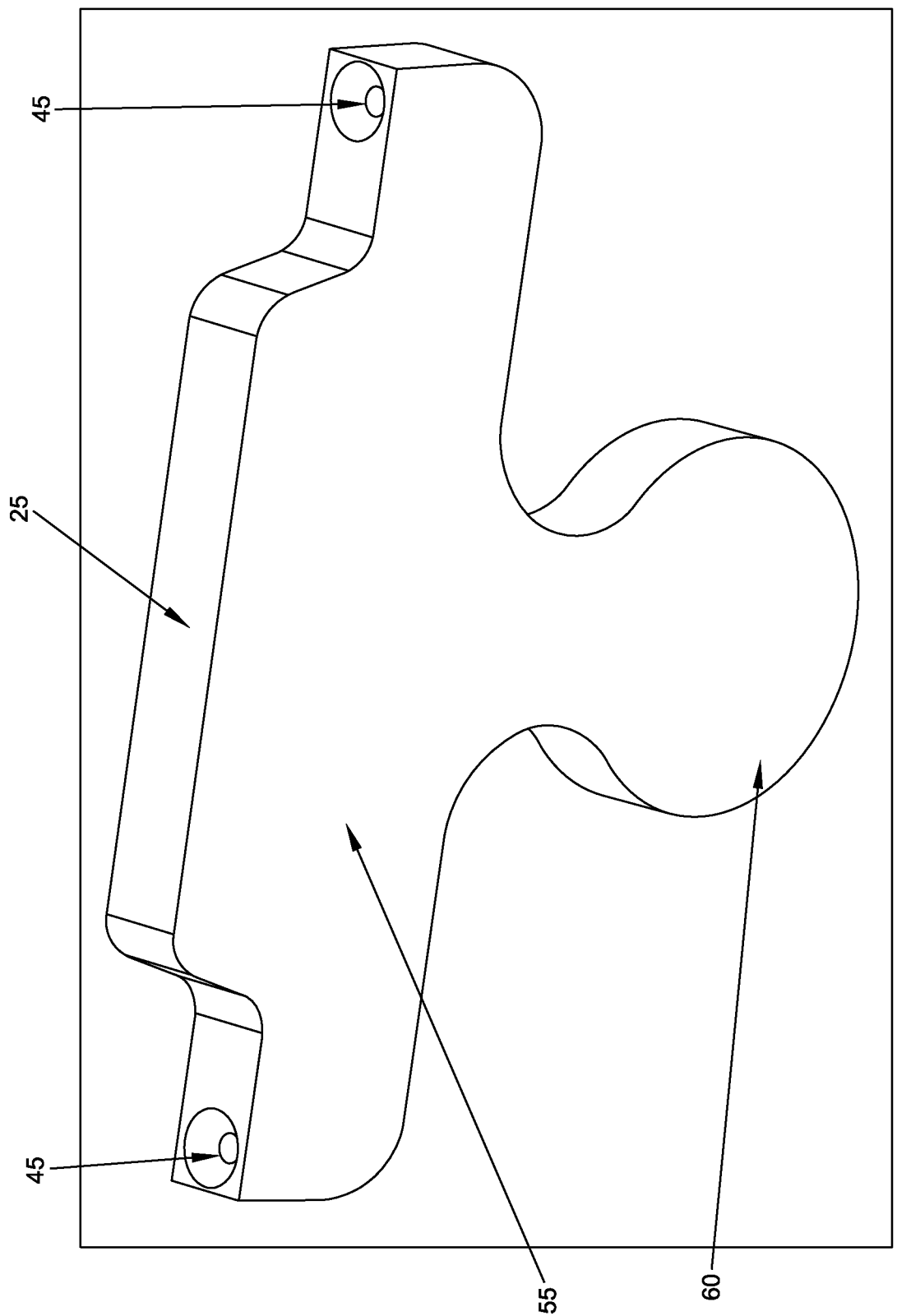
Figure 26:
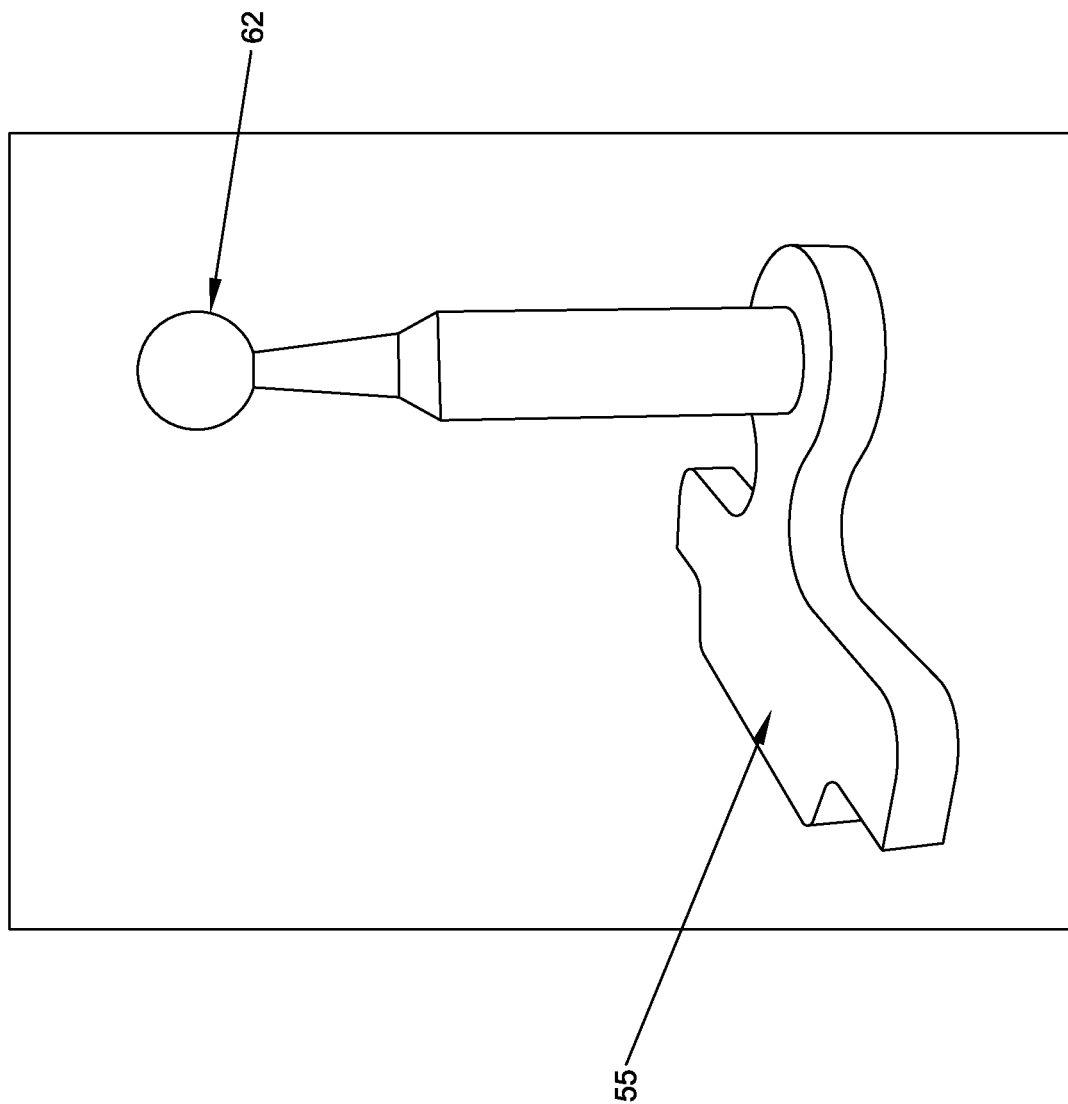
Figure 27:
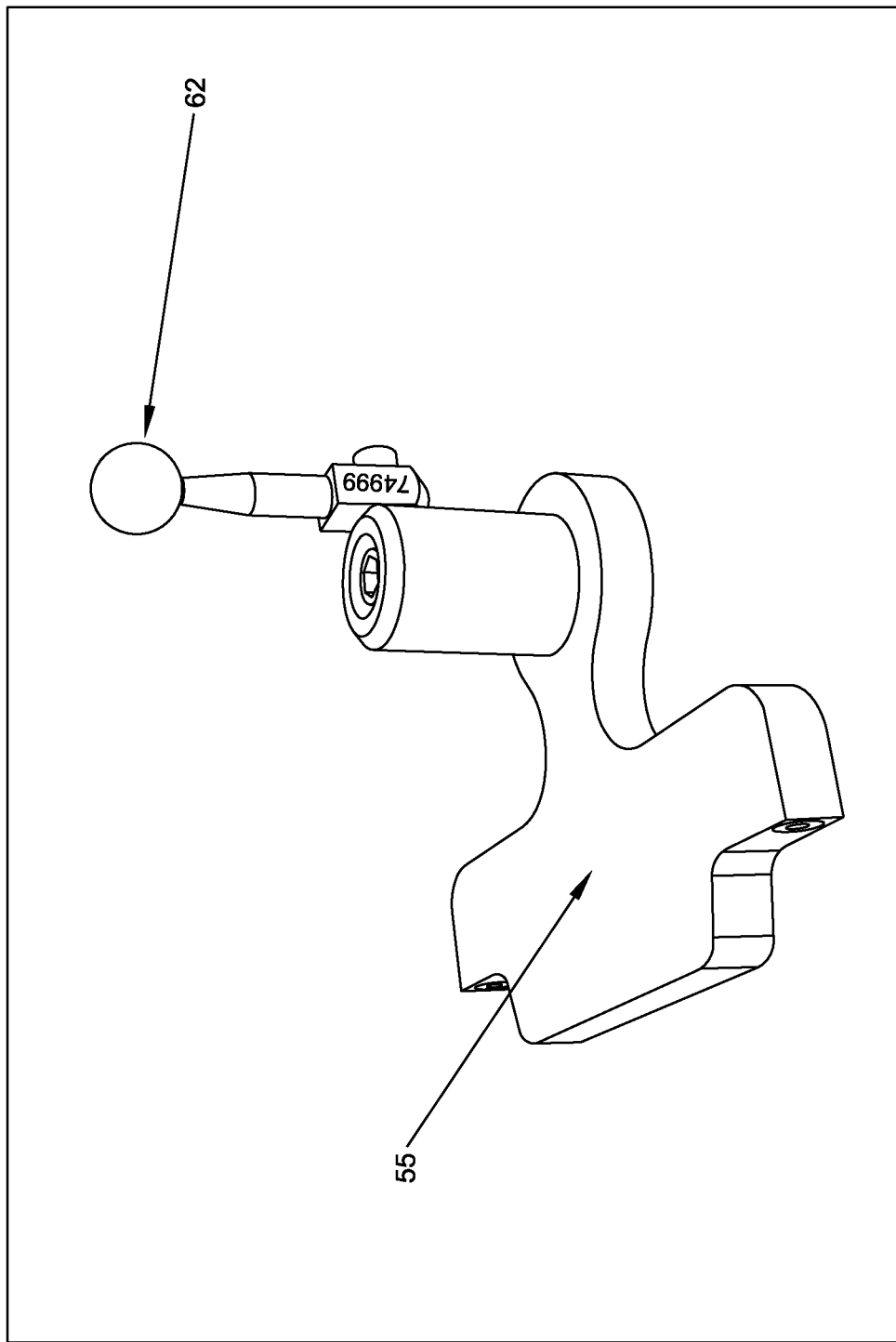
Figure 28:
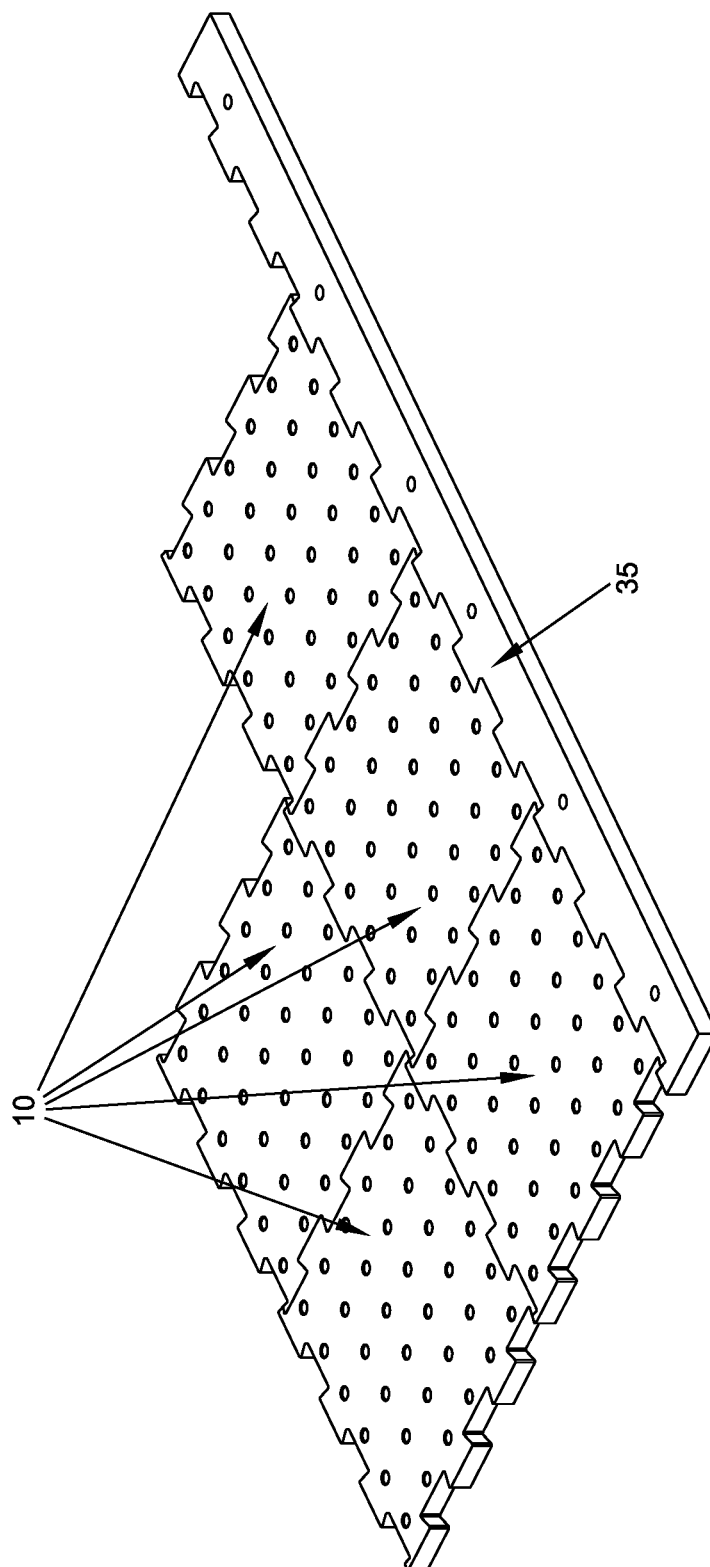
FIGS. 28-31 are schematic views showing how the various elements of the novel modular fixture plate system may be formed out of molded plastic.
Figure 29:
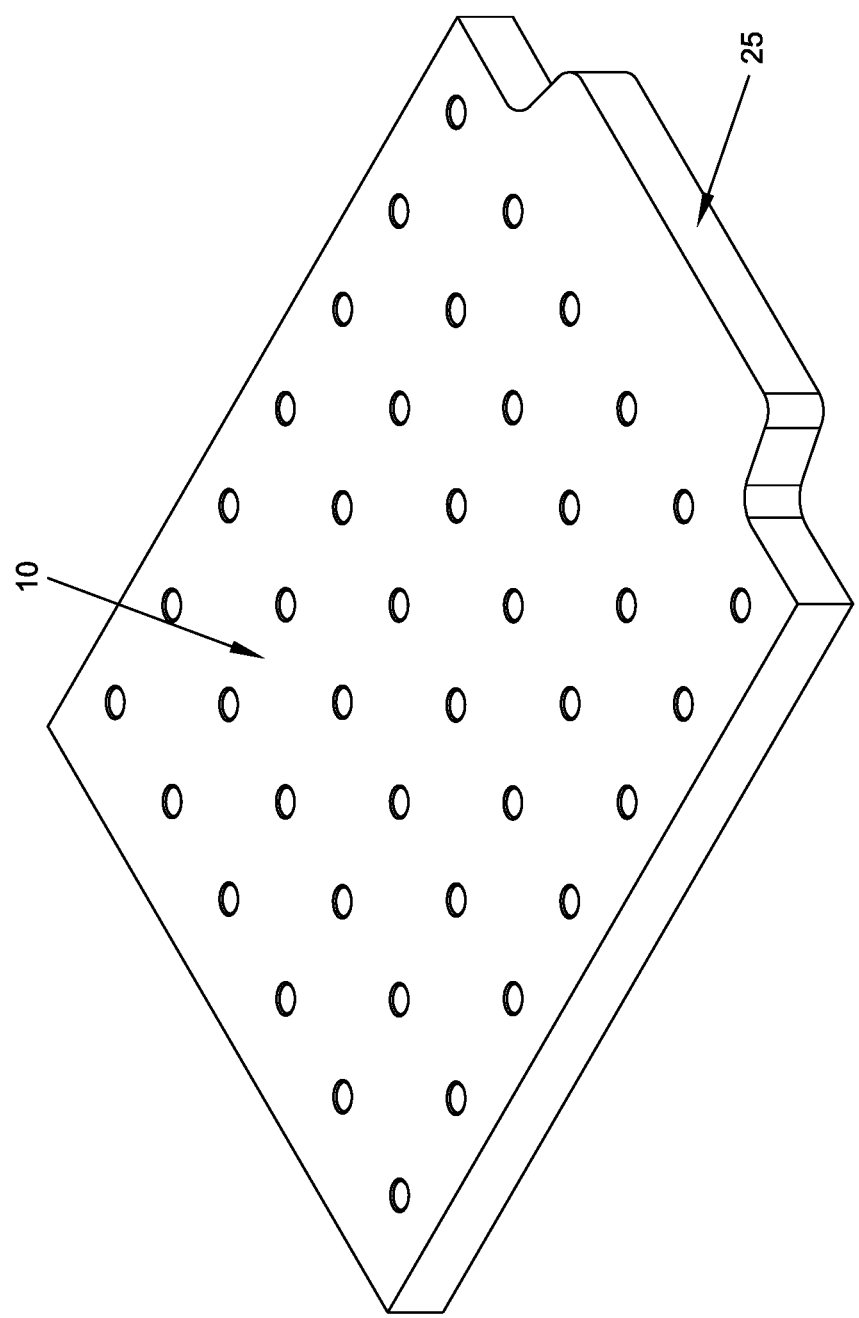
Figure 30:
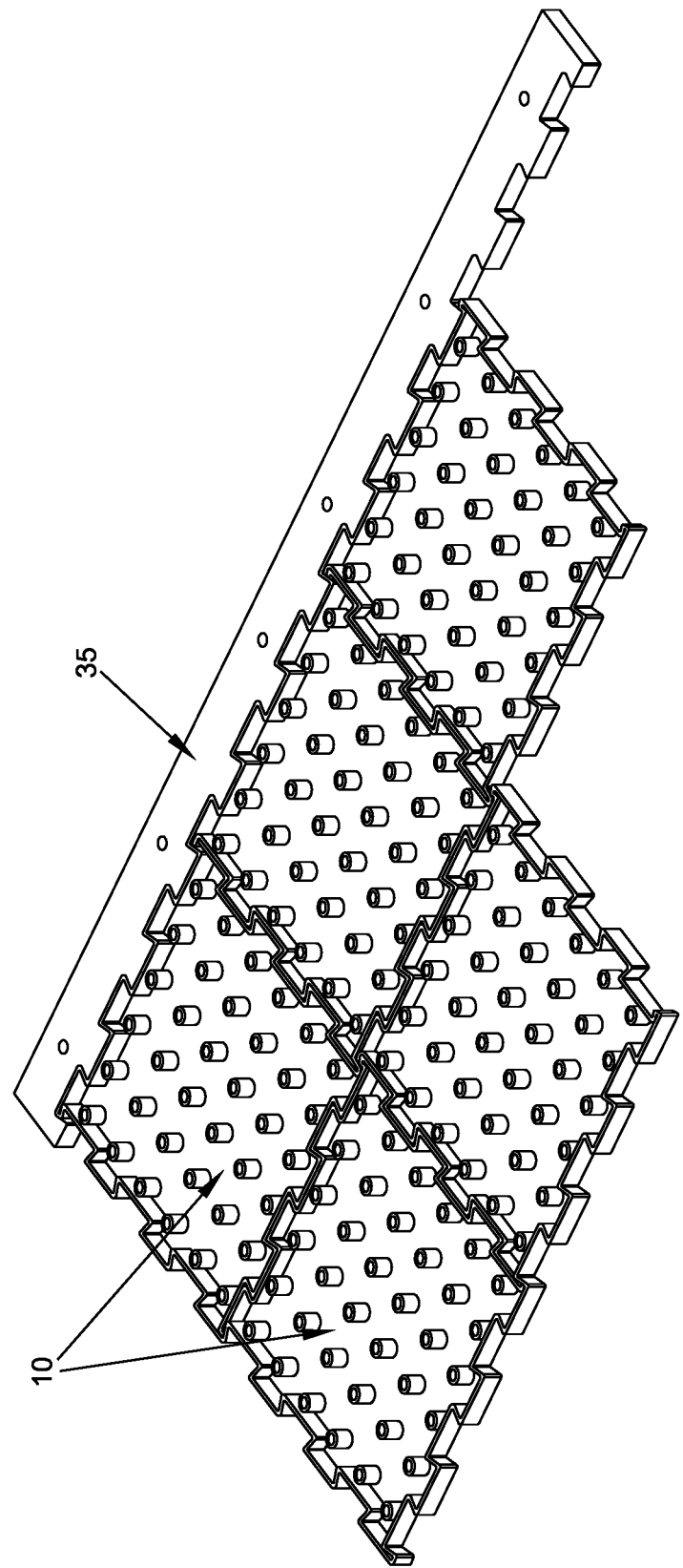
Figure 31:
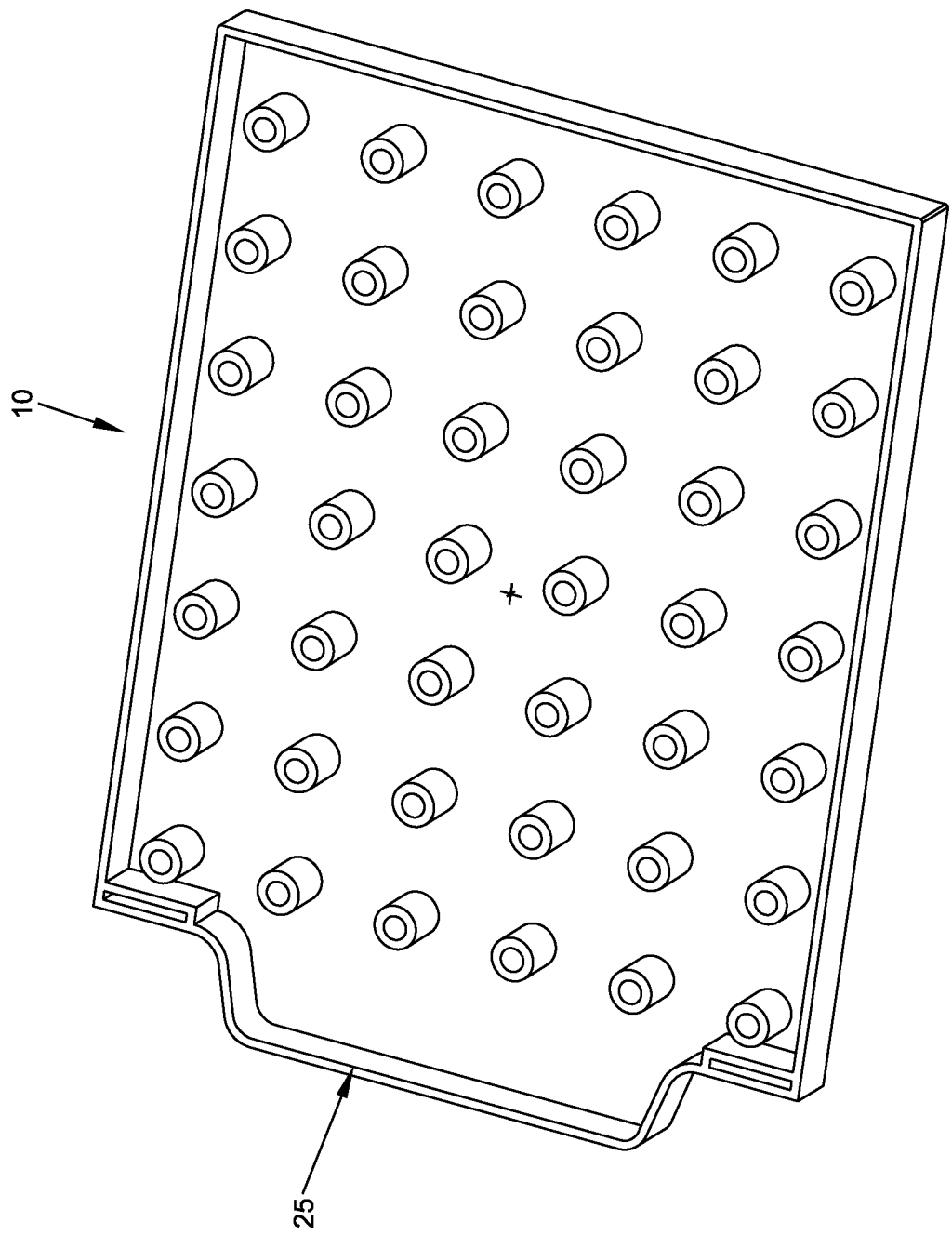

Another unique feature of modular fixture plate system 5 is the provision of a removable qualifying ball plate 55 which may be used for quality inspection, e.g., FIGS. 22 and 23 show one possible configuration for qualifying ball plate 55 and FIGS. 24 and 25 show another possible configuration for qualifying ball plate 55. The removable qualifying ball plate 55 preferably comprises a rounded end 60 on one end and a male projection 25 on its other end, where male projection 25 allows removable qualifying ball plate 55 to be secured to another element of modular fixture plate system 5 (i.e., an interlocking fixture plate 10 or a docking plate 35). Alternatively, removable qualifying ball plate 55 may comprise a rounded end 60 on one end and a female recess 30 on its other end, where female recess 30 allows removable qualifying ball plate 55 to be secured to another element of modular fixture plate system 5 (i.e., an interlocking fixture plate 10 or a docking plate 35). The removable qualifying ball plate 55 is a precise tool which carries a qualifying ball 62 (FIGS. 26 and 27) which the probe of an inspection machine touches in order to register the inspection machine. By way of example but not limitation, qualifying ball 62 can be attached to removable qualifying ball plate 55 (e.g., to rounded end 60 of removable qualifying ball plate 55) such that qualifying ball 62 is upstanding from the plane of removable qualifying ball plate 55. This removable qualifying ball plate 55 will normally stay on the inspection machine's work surface while manufactured workpieces are inspected. This removable qualifying ball plate 55 is designed to accept the qualifying ball 62 (or the inspection machine test bar), provide an accurate surface for indicating with respect to the inspection machine probe, and can be moved out of the way quickly and easily when not in use. The surface area and work envelope of the inspection machine is completely free from obstructions and then has more useable space.

The suggested material of all interlocking fixture plates 10 is half inch thick aluminum plate, however, the interlocking fixture plates can be manufactured in a variety of other metals or plastics (see FIGS. 28-31) and can vary in thickness, overall size and geometry, with threaded, straight or tapered holes 32, with and without a subplate. The size of the interlocking fixture plates 10 is chosen based on the size and number of workpieces, and for the size of the machine work area.

Figure 32:
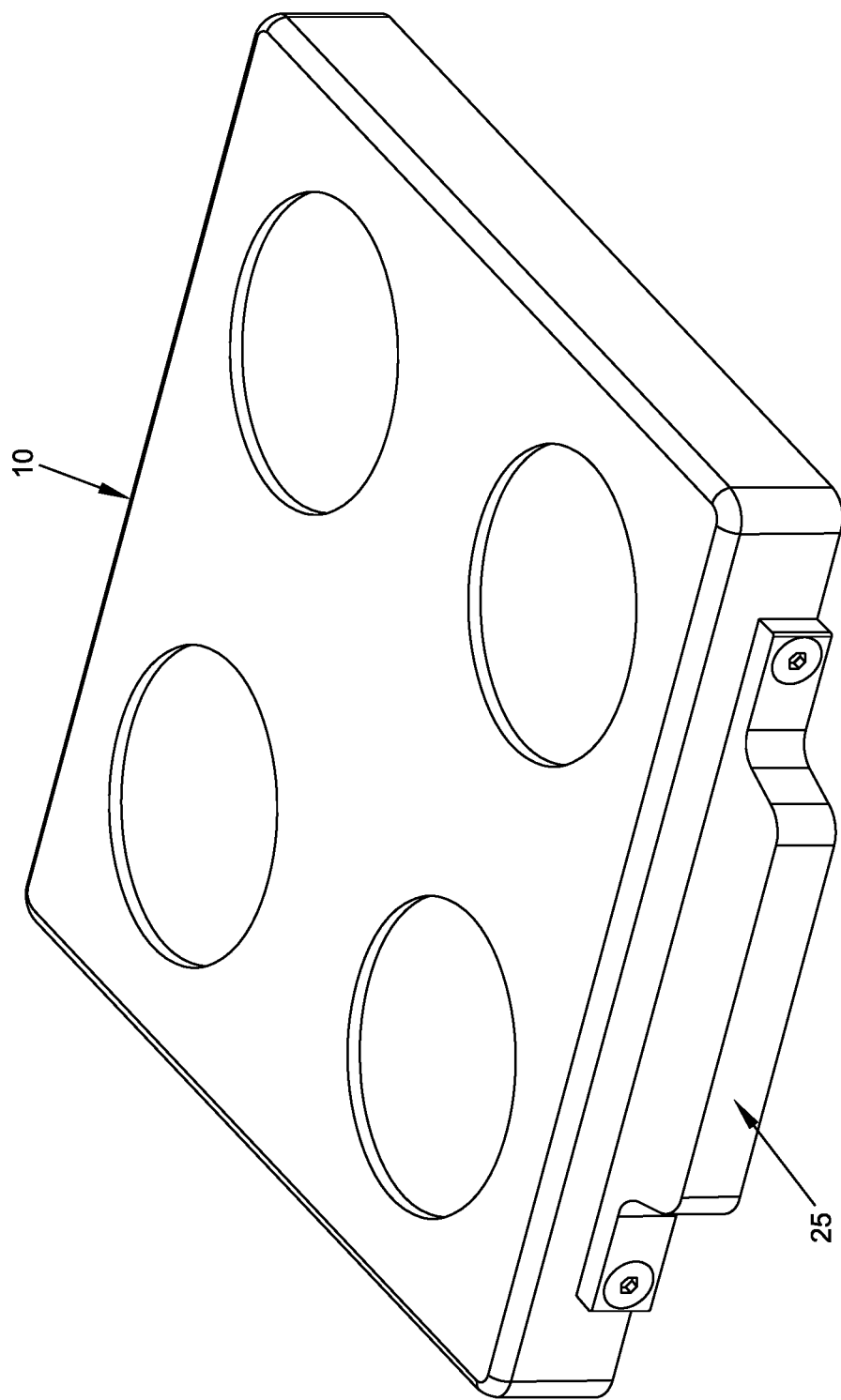

FIGS. 32 and 33 show another possible construction for interlocking fixture plates 10, wherein male projection 25 is manufactured separately from the remainder of interlocking fixture plate 10, and is added during the manufacturing process. This approach has the advantage that male projection 25 can be added to an existing fixture plate so as to make it usable with the present invention.

Benefits of the New Fixture Plate System

Some of the benefits of the new modular fixture plate system 5 are as follows:

- The continuous threaded hole pattern from one interlocking fixture plate to another creates a seamless surface when the interlocking fixture plates 10 are assembled together.
- The interlocking fixture plates 10 can be swapped out quickly while maintaining an accurate repeatable location.
- The interlocking fixture plates 10 can be ordered as blanks (i.e., without holes) and then customized by the end user for an even lower cost solution.
- Standard-sized interlocking fixture plates 10 can be ordered "off-the-shelf", and then configured quickly according to the end user's particular work needs.
- Initial costs are lower since the end user need only order the docking plate 35 and those interlocking fixture plates 10 needed for a particular job, and the end user can then add additional interlocking fixture plates 10 anytime thereafter as needed.
- No tools are necessary to assembly/disassemble particular setups of the modular fixture plate system (after docking plate 35 has been secured to the workbed of a machine).
- Docking plate 35 can be mounted to the workbed of the inspection or manufacturing machine using either an adhesive (e.g., double-sided tape) or bolts, etc.
- Interlocking fixture plates 10 are provided in various sizes so as to collectively make up a uniform, larger fixture plate assembly.
- Multiple workpieces can be fixed to an interlocking fixture plate 10 and then that interlocking fixture plate 10 can be "swapped out" for inspecting and/or working all of the workpieces at the same time; the interlocking fixture plates 10 can be stored when the job is complete.
- Interlocking fixture plates 10 can be provided with dedicated tooling for jobs to reduce setup times and machine operators can pre-set workpieces on interlocking fixture plates 10 so that the workpieces are ready to be inspected and/or worked, thereby improving the production process.
- Multiple interlocking fixture plates 10 can be provided to accommodate larger workpieces.
- It is not necessary to cover the entire workbed with interlocking fixture plates 10.
- The ends of the interlocking fixture plates 10 interlock with one another, and may be kept in place using magnets (e.g., strong rare earth magnets) for a strong locking action.
- Docking plate 35 seats against a far side of a machine's workbed (i.e., out of the way of the work envelope/travel of the probe, laser, or other tools) whereby to provide maximum use of the machine's workbed.
- Docking plate 35 can be quickly and easily secured to the workbed by using double-sided tape or by using counterbored slots 40 to bolt the docking plate to the machine workbed.
- Interlocking fixture plates 10 can be provided in various sizes, whereby to fit any size machine workbed or to accommodate any size workpiece requiring inspection, marking, or light machining.
- Designed to reflect Lean Manufacturing principles.
- Interlocking fixture plates 10 can be quickly "swapped out" for inspection, thereby reducing the chance of damaging probes.
- Existing interlocking fixture plates 10 can be retroactively modified for use with the system using separately-manufactured male projections 25.
- A special ball plate 55 can be provided for quality inspection (i.e., locating the ball). The ball can be inspected and then moved out of the way quickly for an unobstructed workbed.
- A simple and inexpensive base plate 50 can be provided to mount the fixture plate system 5 to a machine.
- Plastic injection molding can be used to manufacture low-cost interlocking fixture plates 10 for the marking industry.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A modular fixture plate system comprising:
a plurality of interlocking fixture plates, wherein each of the plurality of interlocking fixture plates comprises at least one of a male end and a female end, wherein each of the male end comprises at least one male projection and each of the female end comprises at least one female recess;
a ball plate, wherein the ball plate comprises a rounded end and at least one of a male end and a female end, wherein the male end of the ball plate comprises at least one male projection and the female end of the ball plate comprises at least one female recess; and
a docking plate comprising at least one of at least one male projection and at least one female recess;
wherein the at least one male projection or female recess of one of the plurality of interlocking fixture plates is interlocked with a mating one of the at least one male projection or the at least one female recess of at least one of (i) a second one of the plurality of interlocking fixture plates, and (ii) the docking plate; and
further wherein the at least one male projection or female recess of the ball plate is interlocked with a mating one of the at least one male projection or the at least one female recess of at least one of (i) one of the plurality of interlocking fixture plates, and (ii) the docking plate.

2. The modular fixture plate system according to claim 1 wherein the male end of at least one of the plurality of interlocking fixture plates comprises a plurality of male projections.

3. The modular fixture plate system according to claim 1 wherein the female end of at least one of the plurality of interlocking fixture plates comprises a plurality of female recesses.

4. The modular fixture plate system according to claim 1 wherein the docking plate comprises at least one male projection.

5. The modular fixture plate system according to claim 1 wherein the docking plate comprises a plurality of male projections.

6. The modular fixture plate system according to claim 1 wherein the docking plate comprises at least one female recess.

7. The modular fixture plate system according to claim 1 wherein the docking plate comprises a plurality of female recesses.

8. The modular fixture plate system according to claim 1 comprising a plurality of docking plates.

9. The modular fixture plate system according to claim 1 wherein at least one interlocking fixture plate of the plurality of interlocking fixture plates comprises at least one threaded hole formed therein.

10. The modular fixture plate system according to claim 1 wherein at least one interlocking fixture plate of the plurality of interlocking fixture plates comprises a plurality of threaded holes formed therein.

11. The modular fixture plate system according to claim 10 wherein the plurality of threaded holes are arranged in a regular pattern.

12. The modular fixture plate system according to claim 1 further comprising at least one magnet disposed on at least one of the plurality of interlocking fixture plates and the docking plate.

13. The modular fixture plate system according to claim 12 further comprising at least one magnet disposed on at least one interlocking fixture plate of the plurality of interlocking fixture plates and at least one magnet disposed on the docking plate.

14. The modular fixture plate system according to claim 1 further comprising a base plate for attachment to a machine, wherein the base plate is configured to receive the plurality of interlocking fixture plates and the docking plate.

15. The modular fixture plate system according to claim 1 wherein the at least one male projection of the plurality of interlocking fixture plates and the at least one female recess of the plurality of interlocking fixture plates are formed in a dovetail configuration.

16. A method for positioning a workpiece during a manufacturing and/or inspection process, the method comprising:

providing a modular fixture plate system comprising:

a plurality of interlocking fixture plates, wherein each of the plurality of interlocking fixture plates comprises at least one of a male end and a female end, wherein each of the male end comprises at least one male projection and each of the female end comprises at least one female recess;

a ball plate, wherein the ball plate comprises a rounded end and at least one of a male end and a female end, wherein the male end of the ball plate comprises at least one male projection and the female end of the ball plate comprises at least one female recess; and a docking plate comprising at least one of at least one male projection and at least one female recess;

interlocking the at least one male projection or female recess of one of the plurality of interlocking fixture plates with a mating one of the at least one male projection or the at least one female recess of at least one of (i) a second one of the plurality of interlocking fixture plates, and (ii) the docking plate;

interlocking the at least one male projection or female recess of the ball plate with a mating one of the at least one male projection or the at least one female recess of at least one of (i) one of the plurality of interlocking fixture plates, and (ii) the docking plate; and positioning a workpiece on the at least one interlocking fixture plate.

17. The modular fixture plate system according to claim 1 wherein the plurality of interlocking fixture plates are connected together to collectively form an assembled fixture plate having a desired size.

18. The modular fixture plate system according to claim 17, wherein each one of the plurality of interlocking fixture plates comprises a plurality of threaded holes formed therein, and further wherein the plurality of threaded holes extend across the assembled fixture plate in a continuous pattern.

\* \* \* \* \*